(12) United States Patent
Misawa et al.

(10) Patent No.: US 8,284,451 B2
(45) Date of Patent: Oct. 9, 2012

(54) GENERATING PRINT DATA BASED ON ATTRIBUTES OF SEGMENTED REGIONS OF AN INPUT IMAGE

(75) Inventors: Reiji Misawa, Tokyo (JP); Hiroshi Kaburagi, Yokohama (JP); Tsutomu Sakaue, Yokohama (JP); Takeshi Namikata, Yokohama (JP); Manabu Takebayashi, Isehara (JP); Osamu Linuma, Machida (JP); Naoki Ito, Tokyo (JP); Yoichi Kashibuchi, Tokyo (JP); Junya Arakawa, Kawasaki (JP); Shinji Sano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 12/424,296

(22) Filed: Apr. 15, 2009
(Under 37 CFR 1.47)

(65) Prior Publication Data
US 2010/0097656 A1    Apr. 22, 2010

(30) Foreign Application Priority Data

May 7, 2008    (JP) ................................ 2008-121648

(51) Int. Cl.
*G06F 15/00* (2006.01)
*H04N 1/40* (2006.01)
(52) U.S. Cl. .......................................... 358/2.1; 358/1.9
(58) Field of Classification Search ........................ None
See application file for complete search history.

(56) References Cited

U.S. PATENT DOCUMENTS

| | | |
|---|---|---|
| 6,516,091 B1 | 2/2003 | Nagarajan et al. |
| 6,718,063 B1 | 4/2004 | Lennon et al. |
| 7,054,033 B2 | 5/2006 | Namikata |
| 7,057,764 B1 | 6/2006 | Sakaue |
| 7,206,100 B2 | 4/2007 | Namikata |
| 7,239,425 B2 | 7/2007 | Namikata |
| 7,262,870 B1 | 8/2007 | Namikata |
| 7,298,513 B2 | 11/2007 | Namikata |
| 7,379,209 B1 * | 5/2008 | Dalton ........................... 358/1.9 |
| 7,518,751 B2 | 4/2009 | Namikata |
| 7,583,420 B2 | 9/2009 | Namikata |
| 7,831,107 B2 | 11/2010 | Dai et al. ....................... 382/266 |

(Continued)

FOREIGN PATENT DOCUMENTS

JP        07-334648        12/1995

(Continued)

OTHER PUBLICATIONS

U.S. Appl. No. 12/430,434, filed Apr. 27, 2009. Applicant: Reiji Misawa.

(Continued)

*Primary Examiner* — Twyler Haskins
*Assistant Examiner* — Barbara Reinier
(74) *Attorney, Agent, or Firm* — Fitzpatrick, Cella, Harper & Scinto

(57) ABSTRACT

An input image is segmented into regions based on attributes of the input image. It is determined whether each segmented region is an illustration region. When it is determined that the segmented region is an illustration region, the color of the determined illustration region is compared with that of a region around the illustration region. When these colors coincide with each other as a result of the comparison, attribute information of the illustration region is changed to that of the region around the illustration region. Print data is generated based on the changed attribute information.

9 Claims, 22 Drawing Sheets

U.S. PATENT DOCUMENTS

| | | |
|---|---|---|
| 2005/0213160 A1 | 9/2005 | Namikata |
| 2006/0007457 A1 | 1/2006 | Namikata |
| 2006/0061840 A1 | 3/2006 | Kashibuchi |
| 2007/0024880 A1 | 2/2007 | Sato et al. |
| 2007/0025617 A1* | 2/2007 | Dai et al. ............... 382/180 |
| 2007/0030500 A1 | 2/2007 | Otake et al. |
| 2007/0046961 A1 | 3/2007 | Kashibuchi et al. |
| 2007/0074109 A1 | 3/2007 | Nagahara et al. ......... 715/517 |
| 2007/0086667 A1 | 4/2007 | Dai |
| 2008/0019590 A1 | 1/2008 | Arakawa |
| 2008/0130963 A1 | 6/2008 | Sakaue |
| 2008/0316510 A1 | 12/2008 | Sakaue |
| 2009/0009782 A1 | 1/2009 | Arakawa |
| 2009/0034007 A1 | 2/2009 | Sano et al. |
| 2009/0297033 A1 | 12/2009 | Ito et al. |

FOREIGN PATENT DOCUMENTS

| | | |
|---|---|---|
| JP | 2003-085556 | 3/2003 |
| JP | 2006-157791 | 6/2006 |
| JP | 2006-323870 | 11/2006 |
| JP | 2006-344069 | 12/2006 |
| JP | 2007-109177 | 4/2007 |
| JP | 2007-156841 | 6/2007 |
| JP | 2007-172573 | 7/2007 |

OTHER PUBLICATIONS

U.S. Appl. No. 12/429,613, filed Apr. 24, 2009. Applicant: Reiji Misawa.

U.S. Appl. No. 12/427,403, filed Apr. 21, 2009. Applicant: Yoichi Kashibuchi.

* cited by examiner

```
<?xml version="1.0"?>
<svg:svg xmlns:svg="http://www.w3.org/2000/svg"xmlns:xlink="http://www.w3.org/1999/xlink"xmlns:rcd="http://www.canon.com/ns/rcd"width="606"
height="862"viewBox="0 0 2361 3388">

<svg:image x="0"y="0"width="1240"height="1760"xlink:href="data:image/jpeg;base64,/9/
2wCEAB8VFxsXExSb6GRsjlR8kLK0yLioqLl5DRzhNb2J1c21ibGp7irGWe4OnhGpsmtGcp7a8
xsjGd5TZ6NfA5rHCxr4BlSMjLiguWjjyWr5/bH++vr6+vr6+vr6+vr6+vr6+vr6+vr6+
...
FFABRQB//ZAAA=">
</svg:image>
```

~1202

```
<svg:g x="188"y="284"width="896"height="148"rcd:gType="vectorText">
  <svg:g fill="#020202">
    <path d=" M123.3,779h1.2c2.4,0 10.7,3.1 10.7,4v12h1.4q1.4,0 3.8,-1q2.4,-1 8.6,-4h1c3.5,0 8,2.8 8,5
v2q-14.2-20,2v3q0,3 2,6.6v2.4h2q2,0 6.9,-1.5q5,-1.5 12.1,-4.5h0.5c3.3,0 9.5,3.3 9.5,5
c0,0.8 -23.6,6 -27,6h-1v3q7,22 7,23c0,0.8 -3.2,4 -4,4c-3.1,0 -4.9,-3.4 -6.8,-12.3c-1.4,-7 -2,-9.4 -3,-11.7
q-0.2,-0.4 -0.2,-0.7v-2.4h-2q-2,0 -7.5,2.3q-5.5,2.2 -13,5.7c-3.2,0 -9.5,-6.7 -9.5,-10v-2h3
q3.1,2.4 4.1,3.2q0,9,0.8 1.9,0.8c4,0 21,-5.7 21,-7q-2,-5.2 -9v-1h-3q-3,0 -6.1,1.3q-3.2,1.3-8.9,3.7
h-0.5c-3.4,0 -9.5,-5.1 -9.5,-8c0,-1 1.3,-3.2 -3q3,3 5,3h4q10,-2 14,-2v-2.5c0,-3.8 -3.8,-10.5 -6,-10.5
h-3v-1.5c0,-0.3 3,-3.5 3.3 -3.5z"/>
    <path d=" M199,781h1c2.4,0 9.6,2.2 9.6,3v15h3.2q3.2,0 11.1,-2q7.8,-2 16.1,-5c2.2,0 8,5.8 8,8v2
h-5q0,0 0,0c-1,2.7 -23.2,18 -26,18h-1v2.5q5,18.5 5,21v0.5c0,1.2 -2,1.4 -3,4c-4.1,0 -5.2,-1.9 -6.8,-12.8
c-2.1,-14.2 -3.6,-22.2 -5,-26.2q0,-0.2,-0.4 -0.2,-0.7v-2.4h-1.5q-1.5,0 -7.6,2.3q-6,2,2.3 -10.9,4.7c-2.9,0 -8,-6.1 -8,-9.5
v-2.5h2q3.1,2.4 4.1,3.2q0,9,0.8 1.9,0.8q12,-3 18,-3v-3c0,-6.7 -3.4,-13 -7,-13h-2v-2
c0,-1 2.7,-3.4, -3m34,19c-4,0 -21,4.9 -21,6q2,6 2,11h1.5c1.9,0 17.5,-14.2 17.5,-16v-1z"/>
...
  </svg:g>
</svg:g>
</svg:svg>
```

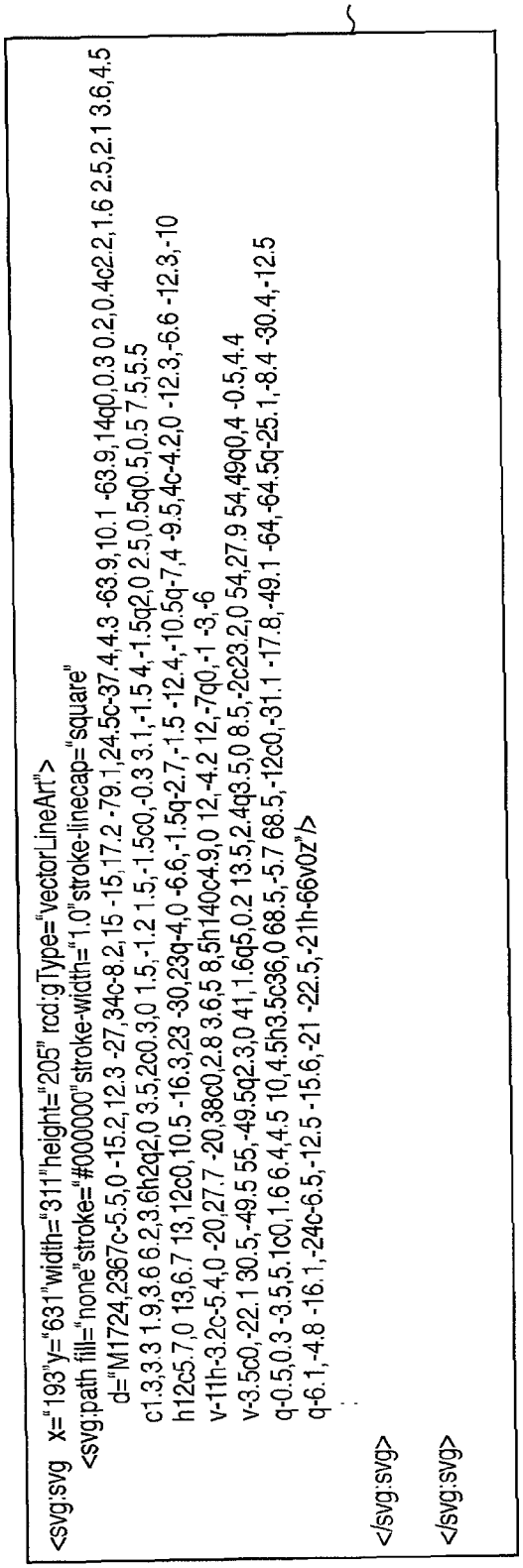

FIG. 13A

```
<?xml version="1.0"?>
<svg:svg xmlns:svg="http://www.w3.org/2000/svg" xmlns:xlink="http://www.w3.org/1999/xlink" xmlns:rcd="http://www.canon.com/ns/rcd" width="606"
height="862" viewBox="0 0 2361 3388"> attribute ="background"                                                                          ~1201

<svg:image x="0" y="0" width="1240" height="1760" xlink:href="data:image/jpeg;base64,/9j/
    2wCEAB8VFxsXEx8bGRsjIR8kLk0yLioqLl5DRzhNb2J1c21ibGp7lrGWe4OnhGpsmtGcp7a8
    xsjGd5TZ6NfA5rHCxr4BlSMjLiguWjlyWr5/bH++vr6+vr6+vr6+vr6+vr6+vr6+vr6+
    ......
    FFABRQB//ZAAA=">
    </svg:image>
```

1301
1304

F I G. 13B

```
<svg:svg  x="188"y="284"width="896"height="148"rcd:gType="vectorText">
  <svg:g fill="#020202">
    <path d=" M123.3,779h1.2c2.4,0 10.7,3.1 10.7,4v12h1.4q1.4,0 3.8,-1q2.4,-1 8.6,-4h1c3.5,0 8,2.8 8,5
v2q-14,2-20,2v3q0,3 2,6.6v2.4h2q2,0 6.9,-1.5q5,-1.5 12.1,-4.5h0.5c3.3,0 9.5,3.3 9.5,5
c0,0.8 -23.6,6 -27,6h-1v3q7,22 7,23c0,0.8 -3.2,4 -4,4c-3.1,0 -4.9,-3.4 -6.8,-12.3c-1.4,-7 -2,-9.4 -3,-11.7
q-0.2,-0.4 -0.2,-0.7v-2.4h-2q-2,0 -7.5,2.3q-5.5,2.2 -13,5.7c-3.2,0 -9.5,-6.7 -9.5,-10v-2h3
q3.1,2.4 4.1,3.2q0.9,0.8 1.9,0.8c4,0 21,-5.7 21,-7q-2,-5-2,-9v-1h-3q-3,0 -6.1,1.3q-3.2,1.3-8.9,3.7
h-0.5c-3.4,0 -9.5,-5.1 -9.5,-8c0,-1 1.3,-3 2,-3q8,3 5,3h4q10,-2 14,-2v-2.5c0,-3.8 -3.8,-10.5 -6,-10.5
h-3v-1.5c0,-0.3 3,-3.5 3.3,-3.5z"/>
    <path d=" M199,781h1c2.4,0 9.6,2.2 9.6,3v15h3.2q3.2,0 11.1,-2q7.8,-2 16.1,-5c2.2,0 8,5.8 8,8v2
h-5q0,0 0,0c-1,2.7 -23,2,18 -26,18h-1v2.5q5,18.5 5,21v0.5c0,1.2 -2,1.4 -3,4c-4.1,0 -5.2,-1.9 -6.8,-12.8
c-2.1,-14.2 -3.6,-22.2 -5,-26.2q-0.2,-0.4 -0.2,-0.7v-2.4h-1.5q-1.5,0 -7.6,2.3q-6.2,2.3 -10.9,4.7c-2.9,0 -8,-6.1 -8,-9.5
v-2.5h2q3.1,2.4 4,1,3.2q0.9,0.8 1.9,0.8q12,-3 18,-3v-3c0,-6.7 -3.4,-13 -7,-13h-2v-2
c0,-1 2.7,-3 4,-3m34,19c-4,0 -21,4.9 -21,6q2,6 2,11h1.5c1.9,0 17.5,-14.2 17.5,-16v-1z"/>
    ...
  </svg:g>
</svg:svg>
```

1302 — attribute = "text"

```
<svg:svg x="193" y="631" width="311" height="205" rcdgType="vectorLineArt">
  <svg:path fill="none" stroke="#000000" stroke-width="1.0" stroke-linecap="square"
  d="M1724,2367c-5.5,0 -15.2,12.3 -27,34c-8.2,15 -15,17.2 -79.1,24.5c-37,4.4,4.3 -63.9,10.1 -63.9,14q0,0.3 0.2,0.4c2.2,1.6 2.5,2.1 3.6,4.5
  c1.3,3.3 1.9,3.6 6.2,3.6h2q2,0 3.5,2c0.3,0 1.5,-1.2 1.5,-1.5c0,-0.3 3.1,-1.5 4,-1.5q2,0 2.5,0.5q0.5,0.5 7.5,5.5
  h12c5.7,0 13,6.7 13,12c0,10.5 -16.3,23 -30,23q-4,0 -6.6,-1.5q-2.7,-1.5 -12.4,-10.5q-7,4 -9.5,4c-4.2,0 -12.3,-6.6 -12.3,-10
  v-11h-3.2c-5.4,0 -20,27.7 -20,38c0,2.8 3.6,5 8,5h140c4.9,0 12,-4.2 12,-7q0,-1 -3,-6
  v-3.5c0,-22.1 30.5,-49.5 55,-49.5q2.3,0 41,1.6q5,0.2 13.5,2.4q3.5,0 8.5,-2c23,2,0 54,27.9 54,49q0,4 -0.5,4.4
  q-0.5,0.3 -3.5,5.1c0,1.6 6.4,4.5 10,4.5h3.5c36,0 68.5,-5.7 68.5,-12c0,-31.1 -49.1,-64,-64.5q-25.1,-8.4 -30,4,-12.5
  q-6.1,-4.8 -16.1,-24c-6.5,-12.5 -15.6,-21 -22.5,-21h-66v0z"/>
</svg:svg>
</svg:svg>
```

1303 — attribute = "graphic"

1306

1203

GENERATING PRINT DATA BASED ON ATTRIBUTES OF SEGMENTED REGIONS OF AN INPUT IMAGE

BACKGROUND OF THE INVENTION

1. Field of the Invention

The present invention relates to an image processing apparatus and image processing method for segmenting an input image into regions, assigning attribute information to the segmented regions, and generating print data based on the attribute information.

2. Description of the Related Art

There has conventionally been proposed a method of clustering illustration regions (clip art regions) in an original image by color, and vectorizing them (see, e.g., Japanese Patent Laid-Open No. 2007-109177). The illustration region is a region where the contour of an object is clearer than a natural image such as a photograph, and the number of colors in it is limited.

However, the image quality becomes poor when vector data is generated from an illustration region and printed. For example, even when the color inside an illustration region and the color around it are originally the same, they are printed in different tints. This is because the illustration region has a graphic attribute, its peripheral region has an image attribute, and different color processes and image forming processes are executed in accordance with these pieces of attribute information. Image processing (e.g., color processing and image forming processing) suitable for graphics and that suitable for images are different. Thus, a region with a graphic attribute and one with an image attribute undergo different image processes. As a result, these regions seem to have different tints.

There is also proposed a method of preventing the phenomenon in which even pixel regions having the same color data are printed in different tints (see, e.g., Japanese Patent Laid-Open No. 2006-157791).

According to this method, a bitmap image and attribute information of each pixel are created based on a rendering command. The similarity of color data between a pixel of interest and the remaining pixels is determined. Then, attribute change processing is done for each pixel.

However, when generating vector data from an illustration region and printing it, even if the color inside an illustration region and the color around it are originally the same, these colors are printed in different tints. If the method as disclosed in Japanese Patent Laid-Open No. 2006-157791 is applied to this problem, the following problems arise.

First, the processing load is high because attribute change processing needs to be performed for each pixel. Second, it is difficult to convert bitmap data into a PDL format.

SUMMARY OF THE INVENTION

It is an object of the present invention to prevent the phenomenon in which even pixel regions having the same color data are printed in different tints.

According to one aspect of the present invention, there is provided an image processing apparatus which segments an input image into regions, assigns attribute information to the segmented regions, and generates print data based on the attribute information, the apparatus comprising: a unit that segments the input image into regions based on attributes of the input image; a determination unit that determines whether each segmented region is an illustration region; a comparison unit that, when the segmented region is determined to be an illustration region, compares a color of the determined illustration region with a color of a region around the illustration region; a change unit that, when the color of the determined illustration region and the color of the region around the illustration region coincide with each other as a result of the comparison, changes attribute information of the illustration region to attribute information of the region around the illustration region; and a generation unit that generates print data based on the changed attribute information.

According to another aspect of the present invention, there is provided an image processing method of segmenting an input image into regions, assigning attribute information to the segmented regions, and generating print data based on the attribute information, the method comprising: segmenting the input image into regions based on attributes of the input image; determining whether each segmented region is an illustration region; when the segmented region is determined to be an illustration region, comparing a color of the determined illustration region with a color of a region around the illustration region; when the color of the determined illustration region and the color of the region around the illustration region coincide with each other as a result of the comparison, changing attribute information of the illustration region to attribute information of the region around the illustration region; and generating print data based on the changed attribute information.

Further features of the present invention will become apparent from the following description of exemplary embodiments with reference to the attached drawings.

BRIEF DESCRIPTION OF THE DRAWINGS

FIGS. 12A and 12B are views exemplifying SVG data as data having undergone vectorization processing by a vectorization unit 507;

FIGS. 13A to 13C are views showing data after assigning attribute information to the data in FIGS. 12A and 12B by an attribute information assigning unit 508;

DESCRIPTION OF THE EMBODIMENTS

Preferred embodiments of the present invention will be described in detail below with reference to the accompanying drawings.

[Configuration of Image Processing System]

Figure 1:
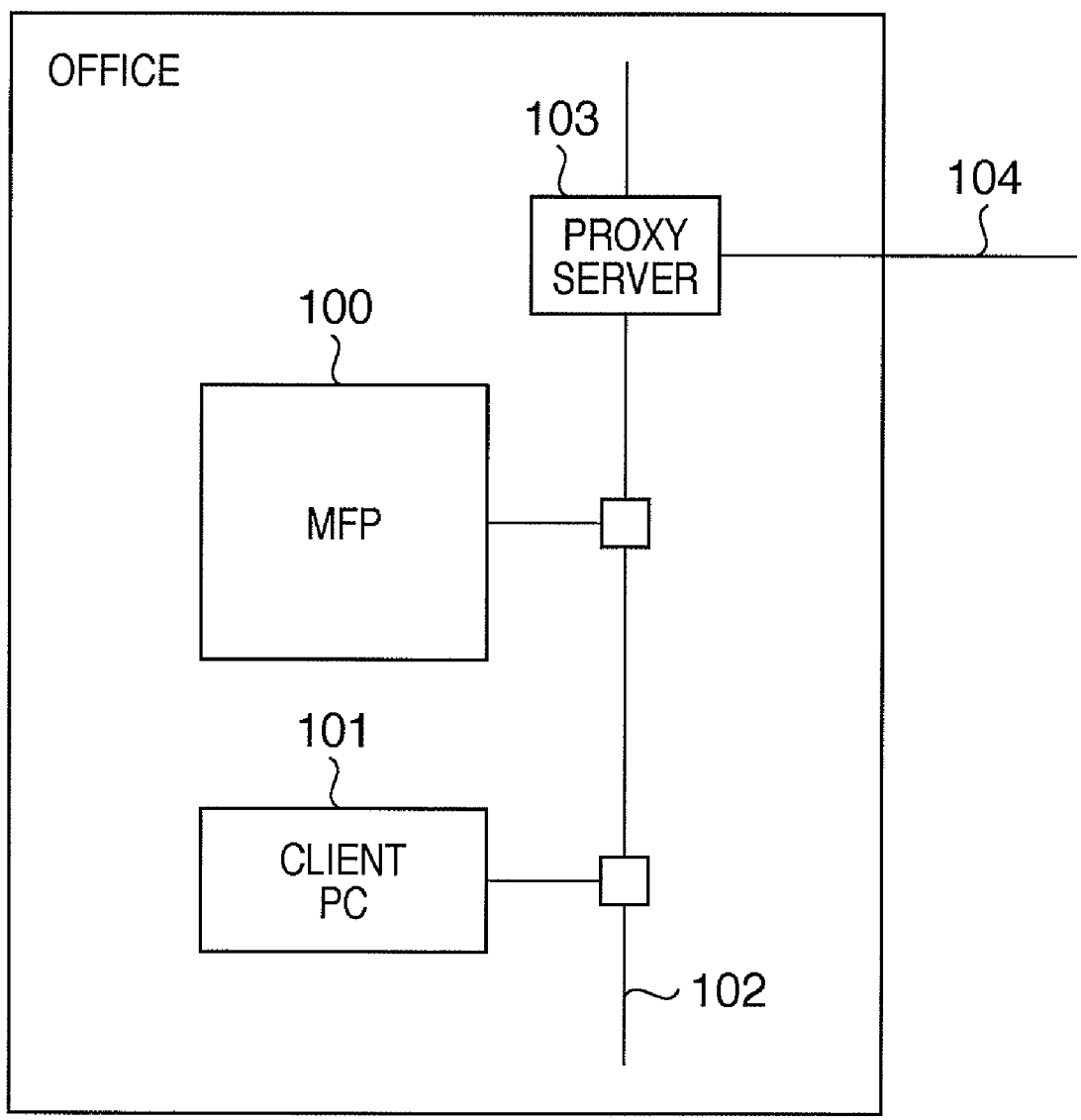
FIG. 1 is a block diagram showing an example of the configuration of an image processing system in an embodiment.

FIG. 1 is a block diagram showing an example of the configuration of an image processing system in an embodiment. Referring to FIG. 1, a multi-functional peripheral (MFP) 100 which provides a plurality of types of functions (e.g., copy function, print function, and facsimile function), a client PC 101, and a proxy server 103 are connected to a LAN 102 built in an office. The LAN 102 is connected to a network 104 via the proxy server 103. The client PC 101 can transmit, for example, print data to the MFP 100 to cause the MFP 100 to output a printed material based on the print data.

Each of the client PC 101 and proxy server 103 has standard building components installed in a general-purpose computer. Examples of these building components are a CPU, RAM, ROM, hard disk, external storage, network interface, display, keyboard, and mouse.

The configuration in FIG. 1 is merely an example. A plurality of offices having the same building components may also be connected to the network 104.

The network 104 is typically a communication network, and suffices to transmit/receive data. The communication network includes the Internet, LAN, WAN, telephone line, dedicated digital line, ATM, frame relay line, communication satellite channel, cable television line, cable television line, data broadcasting radio channel, or a combination of them.

[Multi-Functional Peripheral (MFP)]

Figure 2:
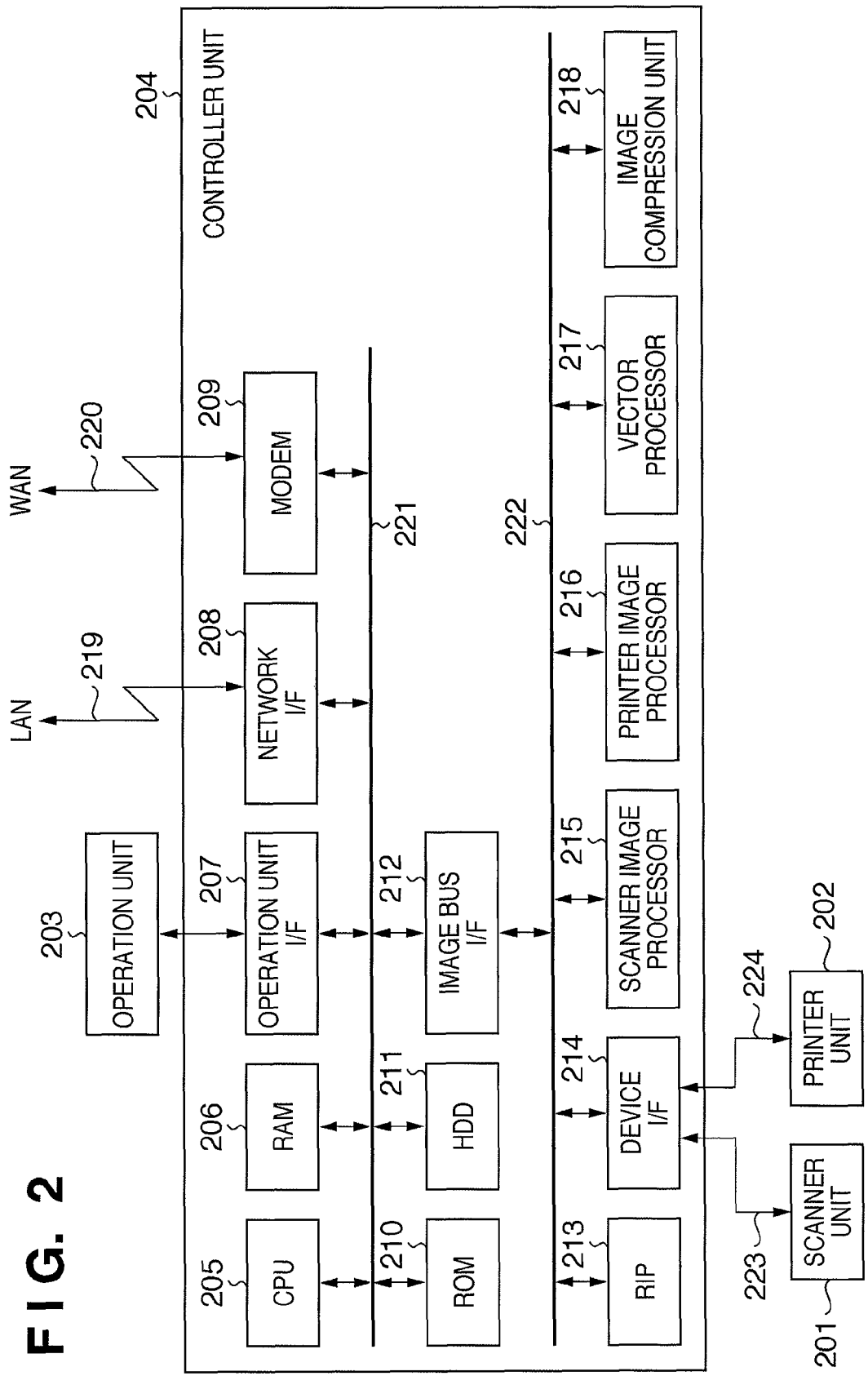
FIG. 2 is a block diagram showing an example of the arrangement of an MFP 100 shown in FIG. 1.

FIG. 2 is a block diagram showing an example of the arrangement of the MFP 100 shown in FIG. 1. The MFP 100 includes a scanner unit 201, printer unit 202, operation unit 203, and control unit (controller unit) 204. The scanner unit 201 is an image input device having an auto document feeder (ADF). The printer unit 202 is an image output device. The operation unit 203 has an operation panel which designates an operation to the MFP and displays the status of the MFP. The operation unit 203 also functions as a user interface. The control unit 204 is connected to the scanner unit 201, printer unit 202, and operation unit 203. Further, the control unit 204 is connected to a LAN 219 and a public line (WAN) 220 serving as a general telephone network. Through these connections, the control unit 204 inputs/outputs image information and device information.

In the control unit 204, a CPU 205 is a controller which controls the overall system. A RAM 206 is a system work memory for operation of the CPU 205, and an image memory for temporarily storing image data. A ROM 210 is a boot ROM which stores control data and programs such as the boot program of the MFP. An HDD (Hard Disk Drive) 211 stores system control software, image data, and the like.

An operation unit I/F 207 is an interface with the operation unit (UI) 203, and outputs, to the operation unit 203, image data to be displayed on the operation unit 203. The operation unit I/F 207 also notifies the CPU 205 of instruction information input by the user via the operation unit 203. A network I/F 208 connects the MFP to the LAN 219, and inputs/outputs packet information. A modem 209 connects the MFP to the public line 220, demodulates or modulates information, and inputs or outputs it. These devices are arranged on a system bus 221.

An image bus interface 212 is a bus bridge which connects the system bus 221 and an image bus 222 for transferring image data at high speed, and converts the data structure. The image bus 222 is formed from, for example, a PCI bus or IEEE1394 bus. The following devices are arranged on the image bus 222.

A raster image processor (RIP) 213 analyzes a PDL code, and rasterizes it into a bitmap image of a designated resolution. In rasterization, attribute information is assigned to each pixel or region, which process will be called image region determination processing. In the image region determination processing, attribute information representing the type of object such as text, line, graphics, or image is assigned to each pixel or region. The RIP 213 outputs an image region signal in accordance with the type of object described in a PDL code. Attribute information corresponding to an attribute represented by the signal value is saved in association with a pixel or region corresponding to the object. Image data has attribute information serving as an identifier for specifying associated image processing.

A device I/F 214 connects the control unit 204 to the scanner unit 201 via a signal line 223 and to the printer unit 202 via a signal line 224. The device I/F 214 performs synchronous/asynchronous conversion of image data. A scanner image processor 215 corrects, processes, and edits input image data. A printer image processor 216 executes correction, resolution conversion, or the like to comply with the printer unit 202 for printout image data to be output to the printer unit 202.

A vector processor 217 executes vector processing for input image data and outputs the processed data. An image compression unit 218 performs JPEG compression/decompression processing or device-specific compression/decompression processing for multilevel image data, and JBIG, MMR, or MH compression/decompression processing for binary image data. This configuration is the detailed hardware configuration of the MFP 100 shown in FIG. 1.

[Scanner Image Processor]

Figure 3:
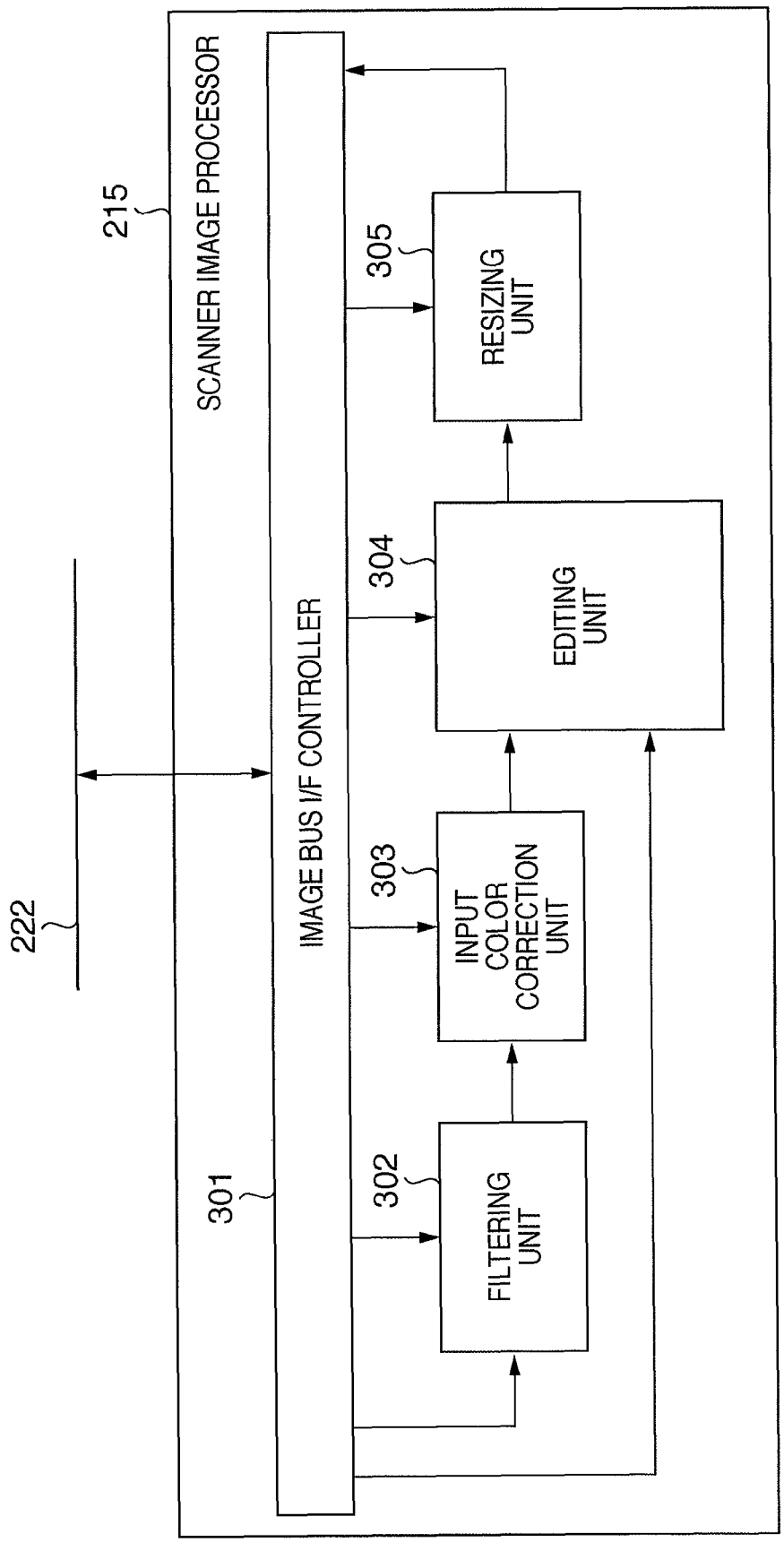
FIG. 3 is a block diagram showing an example of the arrangement of a scanner image processor 215 shown in FIG. 2.

FIG. 3 is a block diagram showing an example of the arrangement of the scanner image processor 215 shown in FIG. 2. Referring to FIG. 3, an image bus I/F controller 301 is connected to the image bus 222, and generates timings to control the bus access sequence and devices in the scanner image processor 215. A filtering unit 302 is a spatial filter which performs convolution calculation. An input color correction unit 303 converts read image data into an appropriate color space using a 3D LUT.

An editing unit 304 recognizes, for example, a closed region surrounded by a marker pen from input image data. The editing unit 304 executes image processes such as shading, hatching, and negative/positive inversion for image data in the closed region. When changing the resolution of a read image, a resizing unit 305 executes interpolation calculation and enlargement/reduction processing for a raster image in the main scanning direction. Resizing in the sub-scanning direction is done by changing the scan speed of an image reading line sensor (not shown). When the document is a text/photograph document, the text region and photograph region in the image are separated, and a text/photograph determination signal representing each region is output.

[Printer Image Processor]

Figure 4:
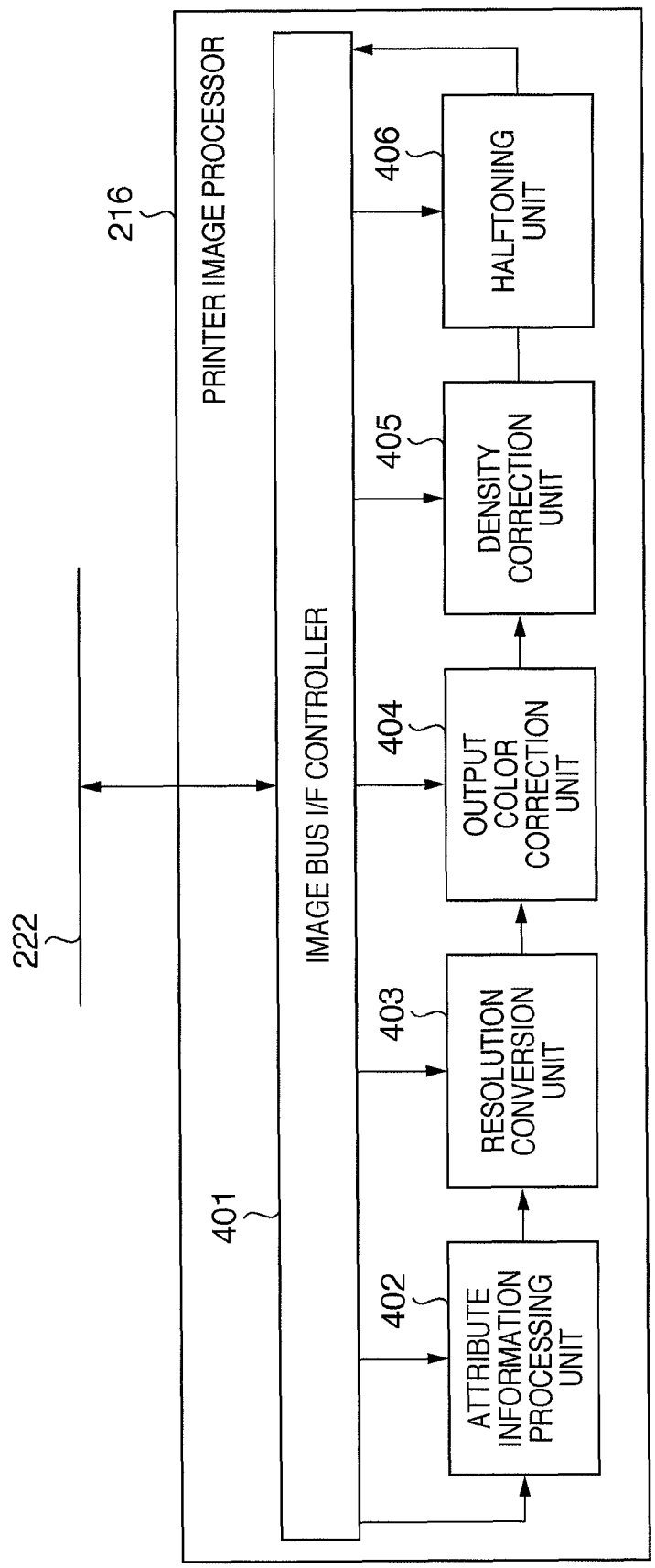
FIG. 4 is a block diagram showing an example of the arrangement of a printer image processor 216 shown in FIG. 2.

FIG. 4 is a block diagram showing an example of the arrangement of the printer image processor 216 shown in FIG. 2. Referring to FIG. 4, an image bus I/F controller 401 is connected to the image bus 222, and generates timings to control the bus access sequence and devices in the printer image processor 216. An attribute information processing unit 402 executes processing to convert attribute information generated by the vector processor 217 into attribute image data. A resolution conversion unit 403 performs resolution conversion to convert the resolution of image data input from the scanner unit 201 or LAN 219 into that of the printer engine of the printer unit 202.

An output color correction unit 404 performs interpolation calculation for image data converted by the resolution conversion unit 403 by using a 3D LUT complying with the characteristics of the printer engine, thereby converting the image data into CMYK print information. A density correction unit 405 executes processing to keep the density characteristic linear using a density correction table. A halftoning unit 406 converts multilevel output image data to have a predetermined number of tone levels by error diffusion processing and screen processing. Each of the output color correction unit 404, density correction unit 405, and halftoning unit 406 in the printer image processor 216 holds a plurality of processing parameters. The processing parameters are controlled in accordance with attribute image data processed by the attribute information processing unit 402.

[Vector Processor]

Figure 5:
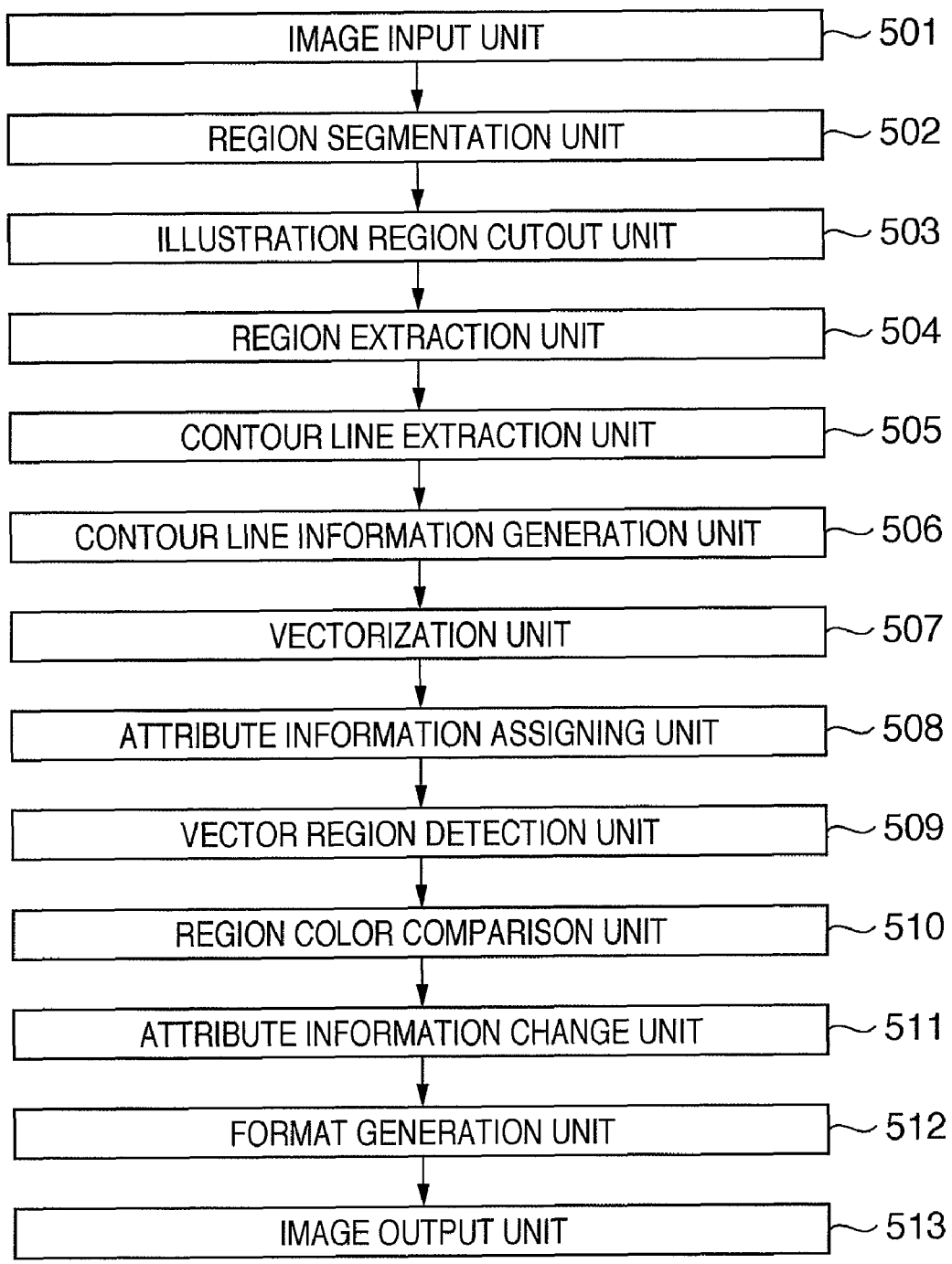
FIG. 5 is a block diagram showing an example of the arrangement of a vector processor 217 shown in FIG. 2.

FIG. 5 is a block diagram showing an example of the arrangement of the vector processor 217 shown in FIG. 2. An image input unit 501 receives, for example, document data read by the scanner unit 201 as image data after the scanner image processor 215 processes the document data. The image input unit 501 also receives PDL data sent from the client PC 101 as image data after the RIP 213 rasterizes the PDL data.

A region segmentation unit 502 segments image data input to the image input unit 501 into a text region, table region, photograph region, illustration region, and the like for respective attributes. The remaining image other than segmented regions is defined as a background region. Region segmentation processing can adopt a known technique. However, according to the present invention, an input image is binarized to generate a binary image, and the binary image is segmented into rectangular regions for respective attributes. For example, a cluster of black pixels (connected black pixels) is extracted from a generated binary image. A rectangular region surrounding the extracted black pixel cluster can be segmented into a text region, table region, photograph region, and the like based on the rectangle size, black pixel density, aspect ratio, and connection when another black pixel cluster exists near the extracted one. A photograph and illustration have almost the same size, black pixel density, and aspect ratio upon binarization. Thus, an illustration region cutout unit 503 discriminates a photograph and illustration by further adding color information to a region determined to be a photograph (illustration) region in a binary image. Each region is extracted as a rectangular region. For example, when the illustration itself is not rectangular, the rectangular illustration region contains the illustration and background.

Figure 10:
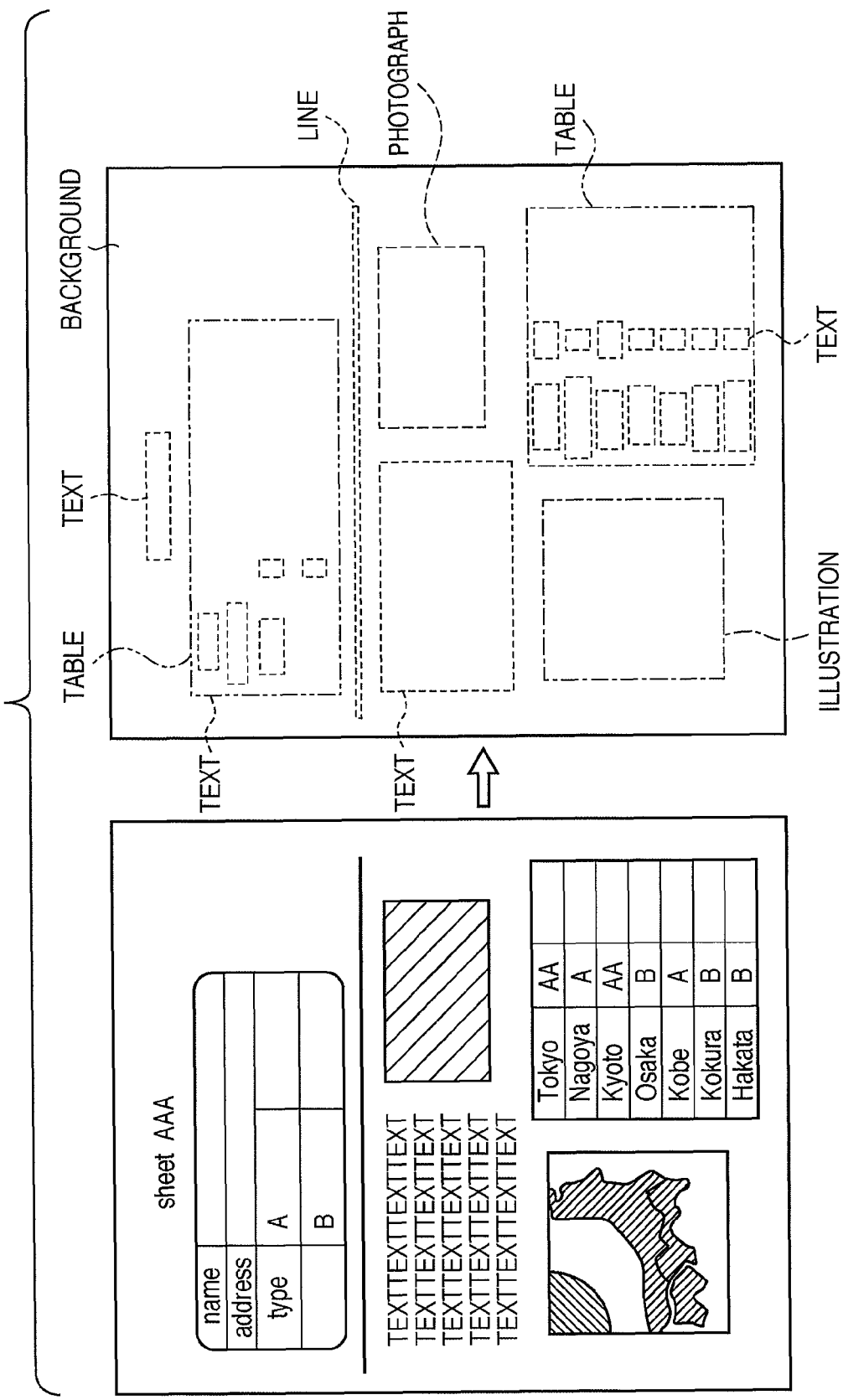
FIG. 10 is a view showing an example of segmenting a document image input from the image input unit 501 into regions by a region segmentation unit 502.

FIG. 10 is a view showing an example of segmenting a document image input from the image input unit 501 into regions by the region segmentation unit 502. An output apparatus such as a printer prints the document image on a print sheet. As for the text, the document image contains relatively large characters such as a title, and relatively small characters such as a caption. As for the image, the document image contains a photograph image, and an illustration image smaller in the number of colors than the photograph image.

An image reading apparatus such as an image scanner reads a printed material bearing this document image. The read image is segmented into regions, obtaining a text region, illustration region, table region, line region, photograph region, and background region, as shown in FIG. 10. The illustration region will be explained in detail with reference to FIG. 6.

Referring back to FIG. 5, the illustration region cutout unit 503 further cuts out an illustration region (image) from an obtained photograph region. "Cutout" means a case wherein an arbitrary region is cut out from a photograph region, and a case wherein the entire photograph region is cut out. The illustration region means an image region where the number of appearance colors is equal to or smaller than a predetermined value (e.g., 256 tones) in the photograph region.

An example of the image of the illustration region is a computer graphic image (image other than a natural image such as a photograph) artificially created by the user using image processing software. That is, the image of the illustration region is an image in which pixels of the same color that form an image are hardly dispersed, like a natural image.

A region extraction unit 504 extracts the color region (color image) of each appearance color from an image which forms an illustration region. A contour line extraction unit 505 extracts the contour line of each extracted color region.

Especially when expressing a contour line by vector data (image description language), a contour line information generation unit 506 generates, as contour line information, a rendering command description (e.g., SVG (Scalable Vector Graphics) path command) which defines the contour line.

A vectorization unit 507 generates vector data by function approximation processing from a contour line generated by the contour line information generation unit 506. The function approximation is approximation using a known spline function, Bezier function, or the like.

Figure 9:
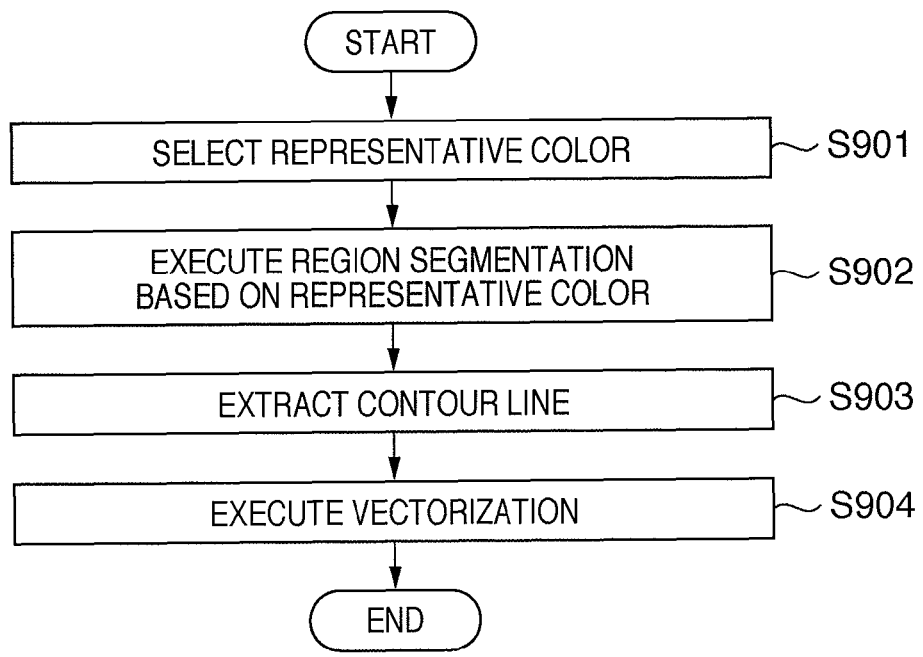
FIG. 9 is a flowchart showing illustration region vectorization processing.

FIG. 9 is a flowchart showing illustration region vectorization processing. In the illustration region vectorization processing, image data of an illustration region cut out by the illustration region cutout unit 503 shown in FIG. 5 is used as input image data.

In step S901, the region extraction unit 504 selects a representative color in the illustration region. In step S902, region segmentation is executed based on the representative color selected by the region extraction unit 504. In step S903, the contour line extraction unit 505 extracts the contour line of the segmented region. In step S904, the contour line information generation unit 506 vectorizes the illustration region for the contour line by using the selected representative color and extracted contour line.

Vectorization is achieved by generating contour line information in, for example, the SVG description in which the contour line is described by a path command and the internal color is described by a fill command.

The vectorization unit 507 executes function approximation processing for the contour line information obtained from the contour line information generation unit 506. FIGS. 12A and 12B show an example of the format of vector data. In this example, vector data is described in the SVG format, but is not limited to this.

Referring back to FIG. 5, an attribute information assigning unit 508 assigns attribute information to a plurality of vector data generated by the vectorization unit 507. As described above, the attribute information is information for controlling the processing parameters of the output color correction unit 404, density correction unit 405, and halftoning unit 406 in the printer image processor 216. The target region in the embodiment is an illustration region, so the graphic attribute is assigned as attribute information.

FIGS. 12A to 14 are views for explaining processing by the attribute information assigning unit 508. FIGS. 12A and 12B are views exemplifying SVG data as data having undergone vectorization processing by the vectorization unit 507.

Rectangle information & JPEG data forms a background region 1201. Rectangle information & vector data forms a text region 1202. Rectangle information & vector data forms an illustration region 1203.

As described above, after vectorization processing, an SVG path command which defines a contour line is replaced with an independent path command for each closed path.

In FIGS. 12A and 12B, each description between "<" and ">" is a set of commands, and is a description example (Path description) of an SVG Path command (Path instruction). An example of the SVG Path command is a description (fill command (fill instruction)) for designating an internal color in a region surrounded by contour lines. Another example is a description (stroke command (stroke instruction)) for designating the color of a contour line. Still another example is a description (stroke command (stroke instruction)) for designating the width of a contour line. Still another example is a description for designating the rendering position (coordinate value) of a contour line. In particular, a description M represents an element to be moved relatively. h and v represent horizontal and vertical relative coordinate moving instructions. c and q represent cubic and quadratic Bezier curve instructions. z represents a closepath (close path) instruction.

When contour line information expresses an illustration region in an input image, for example, the contour line information can configure it. In particular, contour line information includes a compound path and sub-path. The sub-path expresses one closed curve (contour line loop) by one path description. The compound path expresses a plurality of closed curves (contour line loops) by one path description. When the compound path describes outer and inner contour lines by changing the rotational direction of the coordinates of a contour line, the interval between the contour lines can be painted with a designated color.

FIGS. 13A to 13C are views showing data after assigning attribute information to the data in FIGS. 12A and 12B by the attribute information assigning unit 508. In this example, attribute information (attribute="background") 1301 is assigned to the background region 1201. Attribute information (attribute="text") 1302 is assigned to the text region 1202. Attribute information (attribute="graphic") 1303 is assigned to the illustration region 1203.

Figure 6:
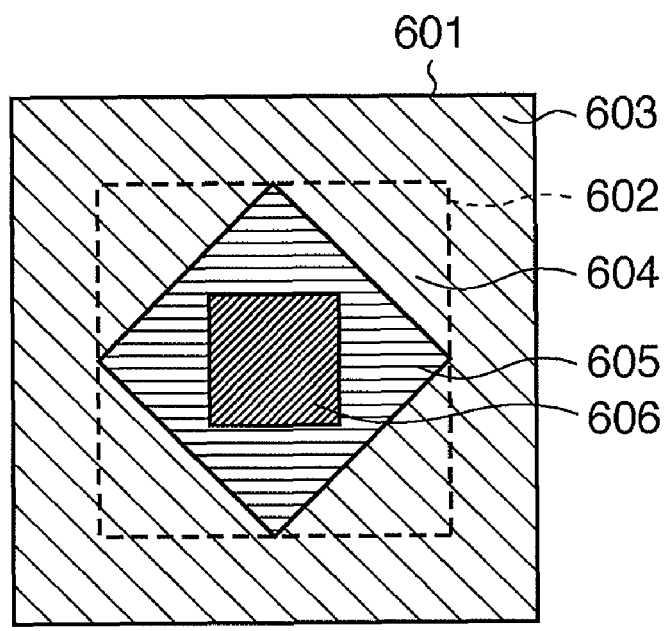
FIG. 6 is a view showing an example of image data 601 input from an image input unit 501.

FIG. 6 is a view showing an example of image data 601 input from the image input unit 501. The region segmentation unit 502 generates a circumscribed rectangle 602 of an illustration region that is indicated by a broken line. A region surrounded by the broken line is an illustration region. Regions 604 to 606 have different colors.

Figure 7:
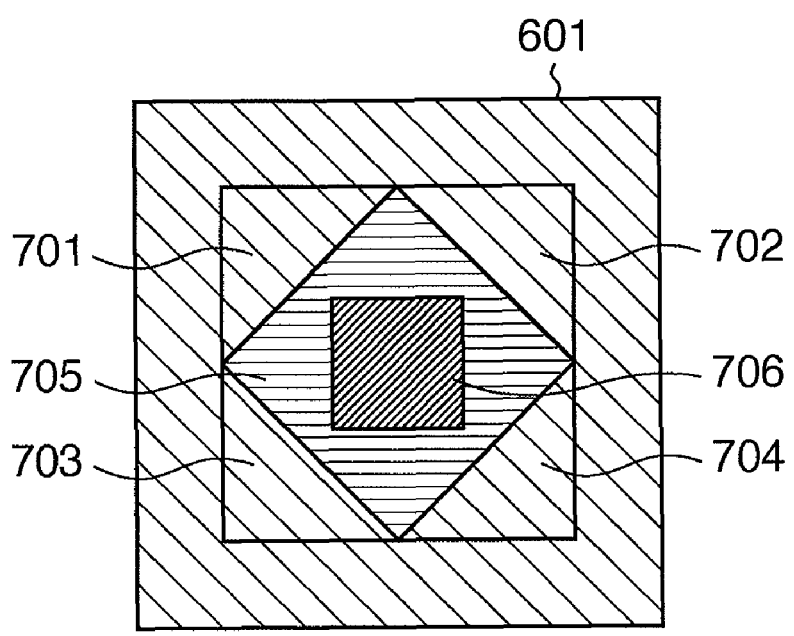
FIG. 7 is a view showing the result of performing vectorization processing for an illustration region.

FIG. 7 is a view showing the result of performing vectorization processing for the illustration region. As shown in FIG. 7, six vector regions 701 to 706 are generated.

Figure 14:
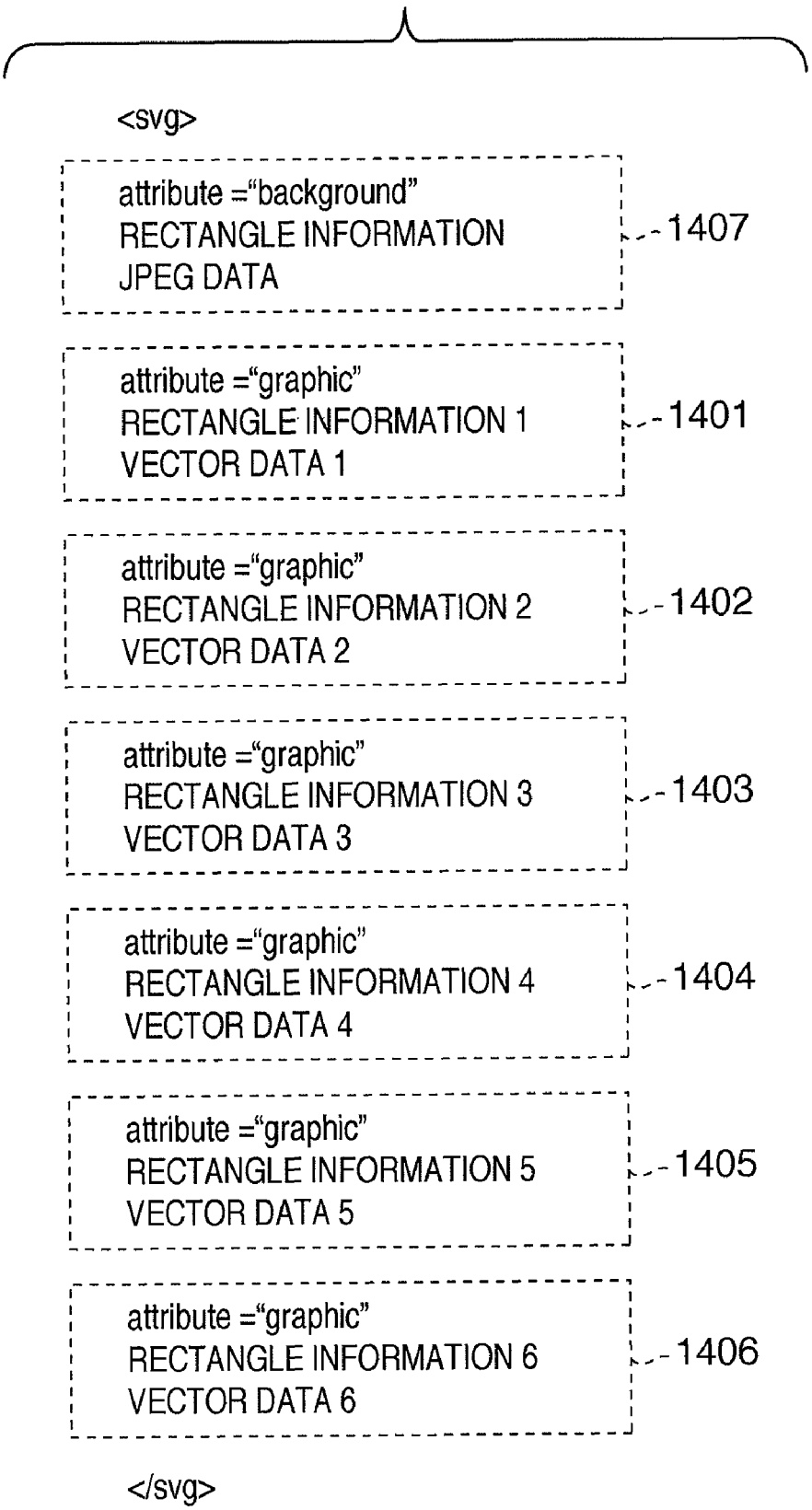
FIG. 14 is a view simply showing SVG data after assigning attribute information to the image shown in FIGS. 6 and 7.

FIG. 14 is a view simply showing SVG data after assigning attribute information to the image shown in FIGS. 6 and 7. SVG data 1401 to 1406 correspond to the vector regions 701 to 706 shown in FIG. 7, respectively. SVG data 1407 corresponds to the background region shown in FIG. 7.

Referring back to FIG. 5, a vector region detection unit 509 detects a vector region which contacts a region outside an illustration region. In the embodiment, this vector region will be called a circumscribed vector region.

Figure 8:
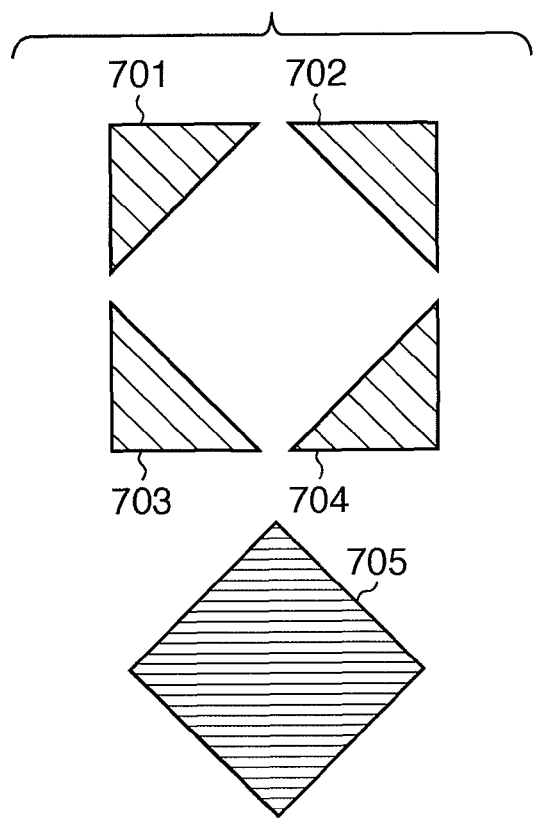
FIG. 8 is a view for explaining processing by a vector region detection unit 509.

FIG. 8 is a view for explaining processing by the vector region detection unit 509. The vector region detection unit 509 detects a circumscribed vector region from the six vector regions 701 to 706 shown in FIG. 7. The reason why the circumscribed vector region is detected is to reduce the processing load on a region color comparison unit to be described later. Processing can be done at higher speed than in a case wherein processing of the region color comparison unit to be described later is performed for all vector regions.

Based on coordinate information of the circumscribed rectangle 602 of the illustration region, the vector region detection unit 509 checks whether the six vector regions 701 to 706 are positioned on the coordinates of the circumscribed rectangle 602. As a method of detecting a circumscribed region, for example, it is checked whether the anchor point of each vector data coincides with a point on the circumscribed rectangle. As shown in FIG. 8, the five vector regions 701 to 705 are detected as circumscribed vector regions shown in FIG. 7. Note that the method of determining whether a vector region is in contact with a circumscribed rectangle is not limited to the above-described one and is arbitrary.

Referring back to FIG. 5, a region color comparison unit 510 compares the color of each circumscribed vector region detected by the vector region detection unit 509 with that of a region outside the illustration region. A method of detecting the color of a region outside the illustration region, and comparison between the color of the circumscribed vector region and that of the region outside the illustration region will be explained.

Figure 11:
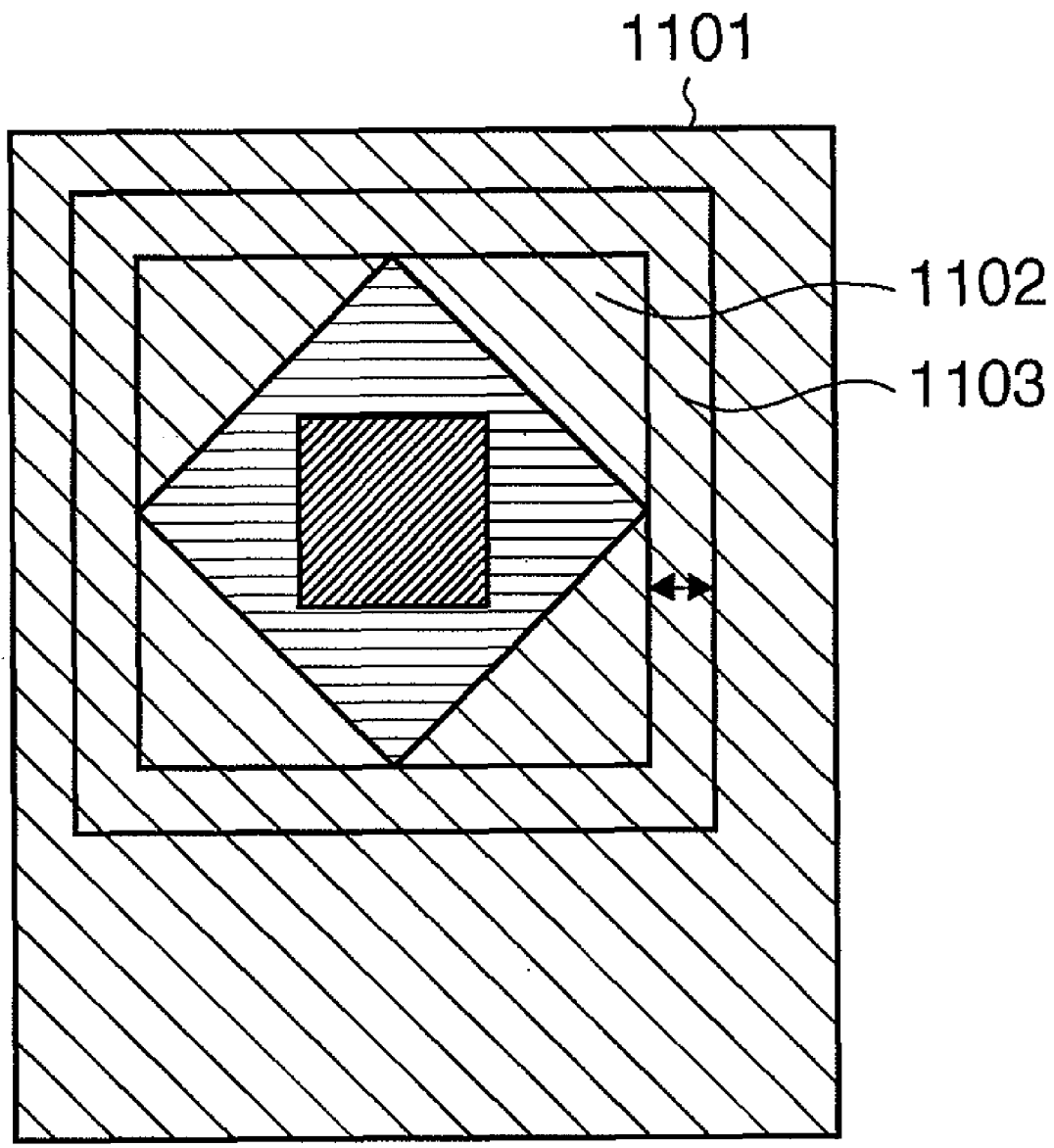
FIG. 11 is a view for explaining a region color comparison unit 510 shown in FIG. 5.

FIG. 11 is a view for explaining the region color comparison unit 510 shown in FIG. 5. As described above, the region color comparison unit 510 compares the color of each circumscribed vector region detected by the vector region detection unit 509 with that of the region outside the illustration region.

Reference numeral 1101 denotes an entire input image. Reference numeral 1102 denotes an illustration region having undergone vectorization processing. As a method of extracting the color of a circumscribed region, colors spaced apart from the illustration region by two pixels are extracted, and the average value of the colors is calculated as the color of the circumscribed region outside the illustration region. In this example, a region 1103 is extracted to obtain a color outside the illustration region.

In this example, the colors of pixels spaced apart from the illustration region by two pixels are extracted. However, the distance of pixels can be arbitrarily set. By setting the distance to several pixels, colors can be extracted in the same way.

The method of obtaining a color outside the illustration region is not limited to the above-described one. The method suffices to extract the color of a region adjacent to the target region.

Then, the color of the circumscribed vector region is compared with that of the region outside the illustration region. As the comparison method, it is determined whether these colors coincide with each other. Alternatively, the difference between the color of the circumscribed vector region and the color outside the illustration region may also be calculated to determine whether the difference is smaller than a preset numerical value.

A case wherein the color of the circumscribed vector region is R=200, G=150, and B=30, and the color outside the illustration region is R=190, G=140, and B=40 will be exemplified. The differences between these colors are 10 for the R component, 10 for the G component, and 10 for the B component. When it is set that colors having a difference of 20 or less are regarded as the same color, it is determined that the color of the circumscribed vector region and the color outside the illustration region coincide with each other. In this example, it is set that colors having a difference of 20 or less for each component are regarded as the same color. However, this value can be arbitrarily set for each color component.

Referring back to FIG. 5, when the region color comparison unit 510 determines as a result of color comparison that the color of the circumscribed vector region and the color outside the illustration are the same color (or similar colors), an attribute information change unit 511 changes attribute information assigned by the attribute information assigning unit 508. In this case, the attribute information change unit 511 changes, to the background attribute, the attribute of vector data which forms the circumscribed vector region detected by the vector region detection unit 509, among vector data to which the attribute information assigning unit 508 has assigned the graphic attribute.

Figure 15:
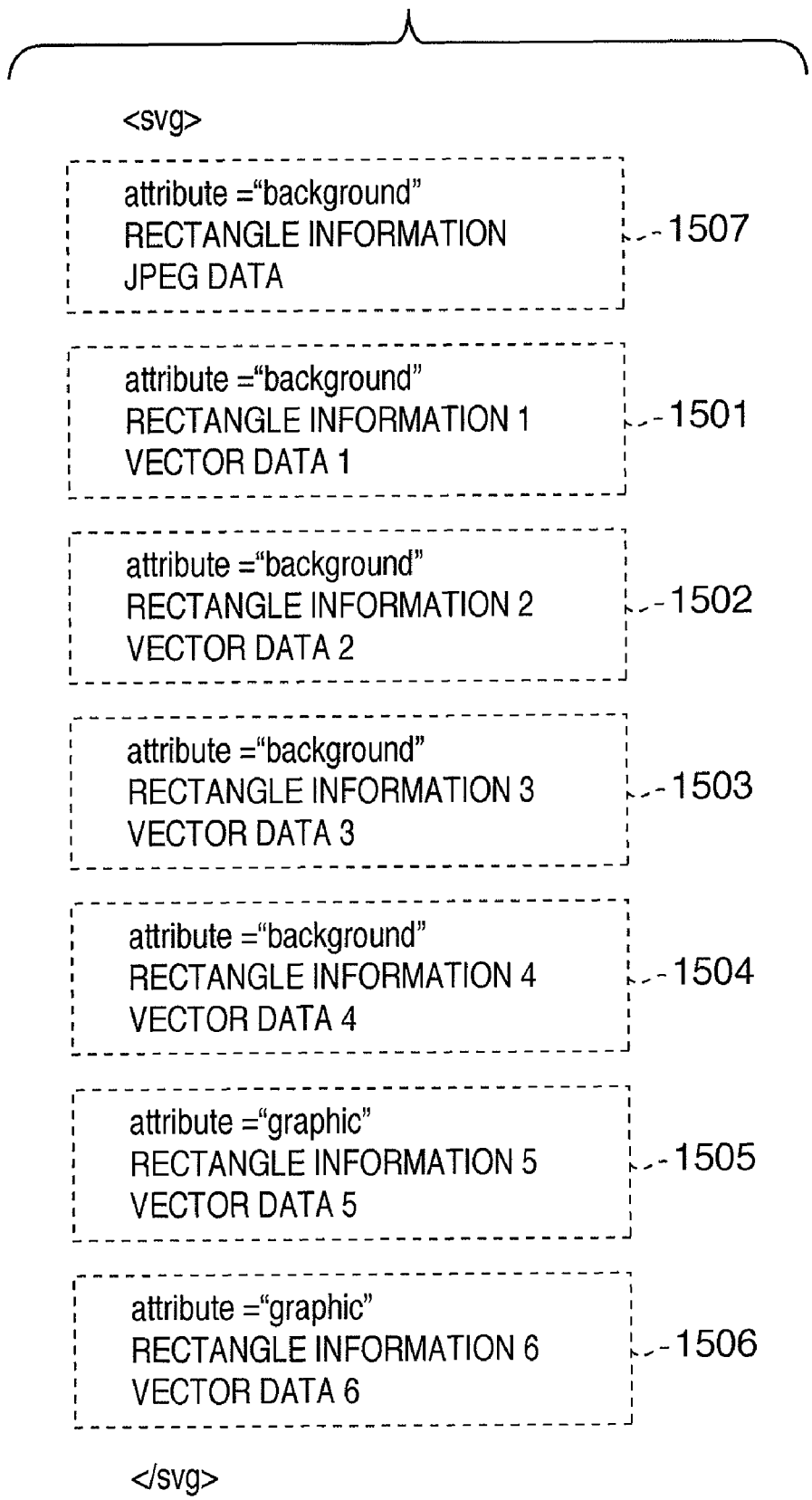
FIG. 15 is a view showing data after changing attribute information of SVG data shown in FIG. 14 based on the comparison result of the region color comparison unit 510.

FIG. 15 is a view for explaining the attribute information change unit 511 shown in FIG. 5. The attribute information change unit 511 changes attribute information based on the result of the region color comparison unit 510.

FIG. 15 is a view showing data after changing attribute information of SVG data shown in FIG. 14 based on the comparison result of the region color comparison unit 510. As a result of the comparison by the region color comparison unit 510, target vector regions in FIG. 14 are ones represented by the SVG data 1401 to 1404, and attribute information of these vector regions is changed. Attribute information (attribute="graphic") of the SVD data 1401 to 1404 is changed into attribute information (attribute="background") of SVG data 1501 to 1504.

Referring back to FIG. 5, a format generation unit 512 generates data of a general-purpose format such as PDF data, SVG data, or PDL data based on the generated raster data, vector data, rectangle information, and attribute information.

Reference numeral 513 denotes an image output unit. PDF data, SVG data, or PDL data generated by the format generation unit 512 is rasterized by the RIP 213, processed by the printer image processor 216, and then output from the printer unit 202.

[Attribute Information Generation Unit]

Figure 17:
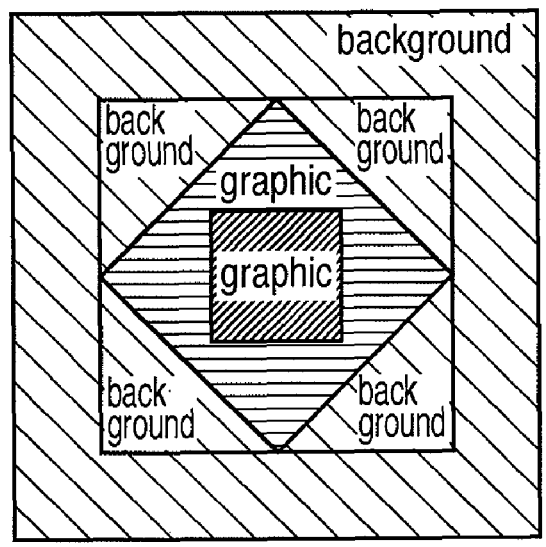
FIG. 17 is a view for explaining an attribute information processing unit 402 of the printer image processor 216.

FIG. 17 is a view for explaining the attribute information processing unit 402 of the printer image processor 216. As described above, the attribute information processing unit 402 executes processing to convert attribute information generated by the vector processor 217 into attribute image data.

Figure 18:
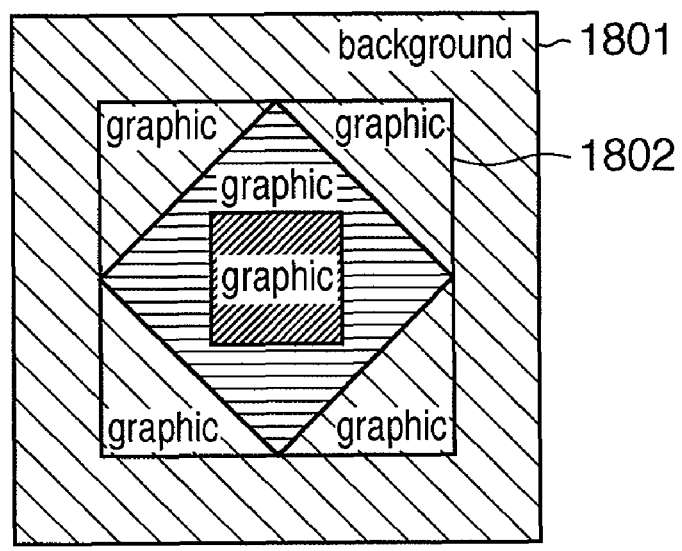
FIG. 18 is a view showing attribute image data generated when no attribute information is changed.

FIG. 17 shows attribute image data generated by the attribute information processing unit 402 in a general-purpose format generated by the format generation unit 512 from SVG data shown in FIG. 15. FIG. 18 shows attribute image data generated when the attribute information change unit 511 does not change attribute information. As shown in FIG. 18, the background attribute is assigned to attribute image data 1801, and the graphic attribute is assigned to attribute image data 1802. As described in the Description of the Related Art, the attribute image data 1801 and 1802 undergo different color processes and appear in different colors.

Figure 16:
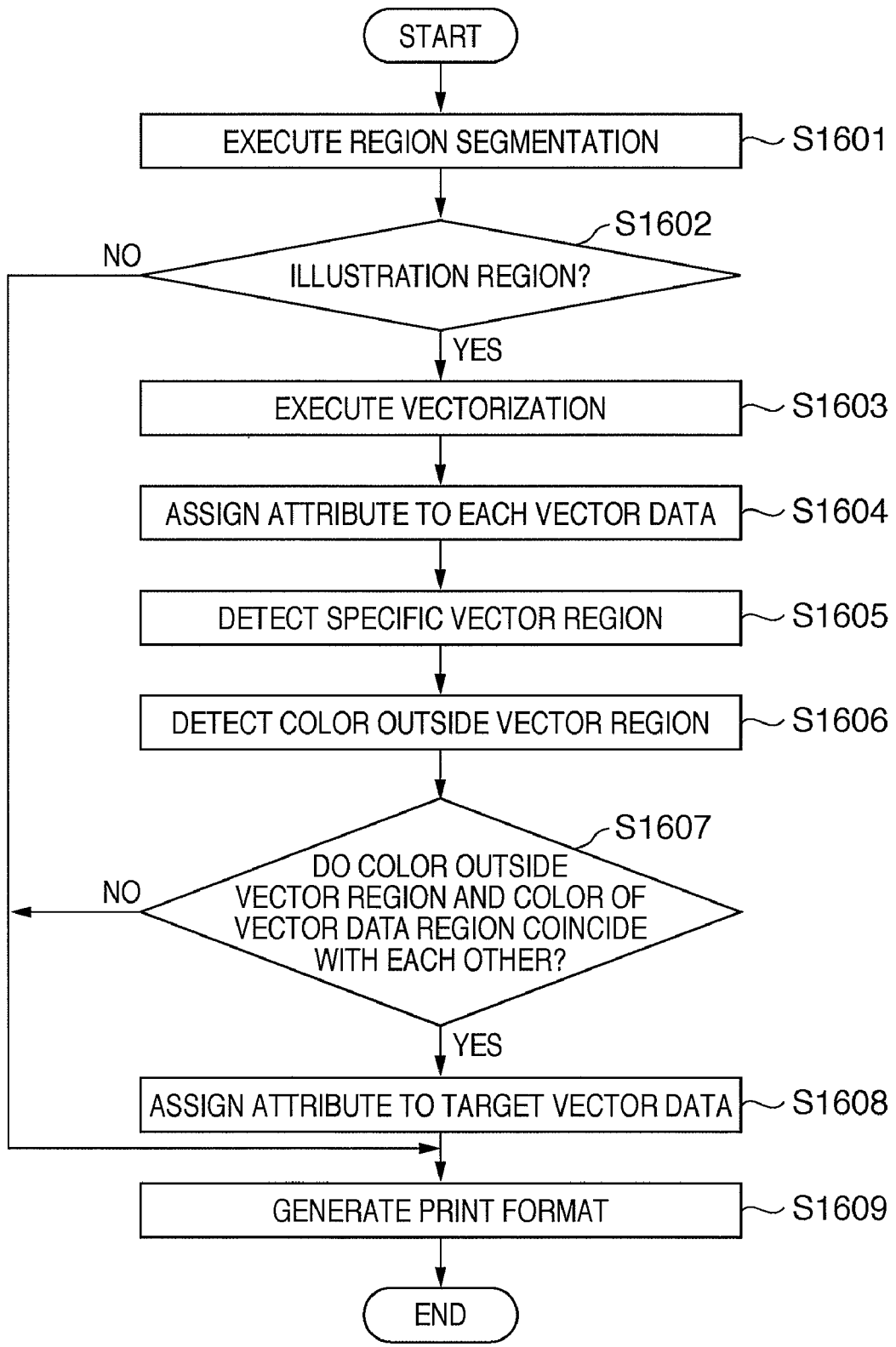
FIG. 16 is a flowchart showing processing in the embodiment.

FIG. 16 is a flowchart showing processing in the embodiment. In step S1601, region segmentation processing is executed to segment an input document image into a text region, illustration region, table region, photograph region, and background region for respective attributes. In step S1602, it is determined whether each segmented region is an illustration region. If it is determined in step S1602 that the segmented region is not an illustration region, a print format is generated in step S1609, and the process ends. If it is determined in step S1602 that the segmented region is an illustration region, the process advances to vectorization processing in step S1603.

In step S1603, vectorization processing is performed for each segmented region. In step S1604, attribute information is assigned to each vector data generated by the vectorization processing in step S1603. In step S1605, the vector region detection unit 509 detects a specific vector region.

In step S1606, the region color comparison unit 510 extracts a color outside the vector region. In step S1607, the region color comparison unit 510 compares the color outside the vector region with that of the vector region. If these colors do not coincide with each other as a result of the comparison, the process advances to step S1609, and the format generation unit 512 generates a print format.

If these colors coincide with each other as a result of the comparison in step S1607, the process advances to step S1608, and the attribute information change unit 511 changes the attribute of the vector region. Then, in step S1609, the format generation unit 512 generates a print format.

The embodiment can prevent the phenomenon in which even pixel regions having the same color data are printed in different tints. Since the attributes of vector data can be changed at once, this decreases the processing load, compared with changing the attribute for each pixel. Further, data can be easily converted into a PDL format.

[Another Embodiment]

A case wherein an illustration region after vectorization processing undergoes an edit operation to print edited data will be explained as another embodiment.

Figure 19:
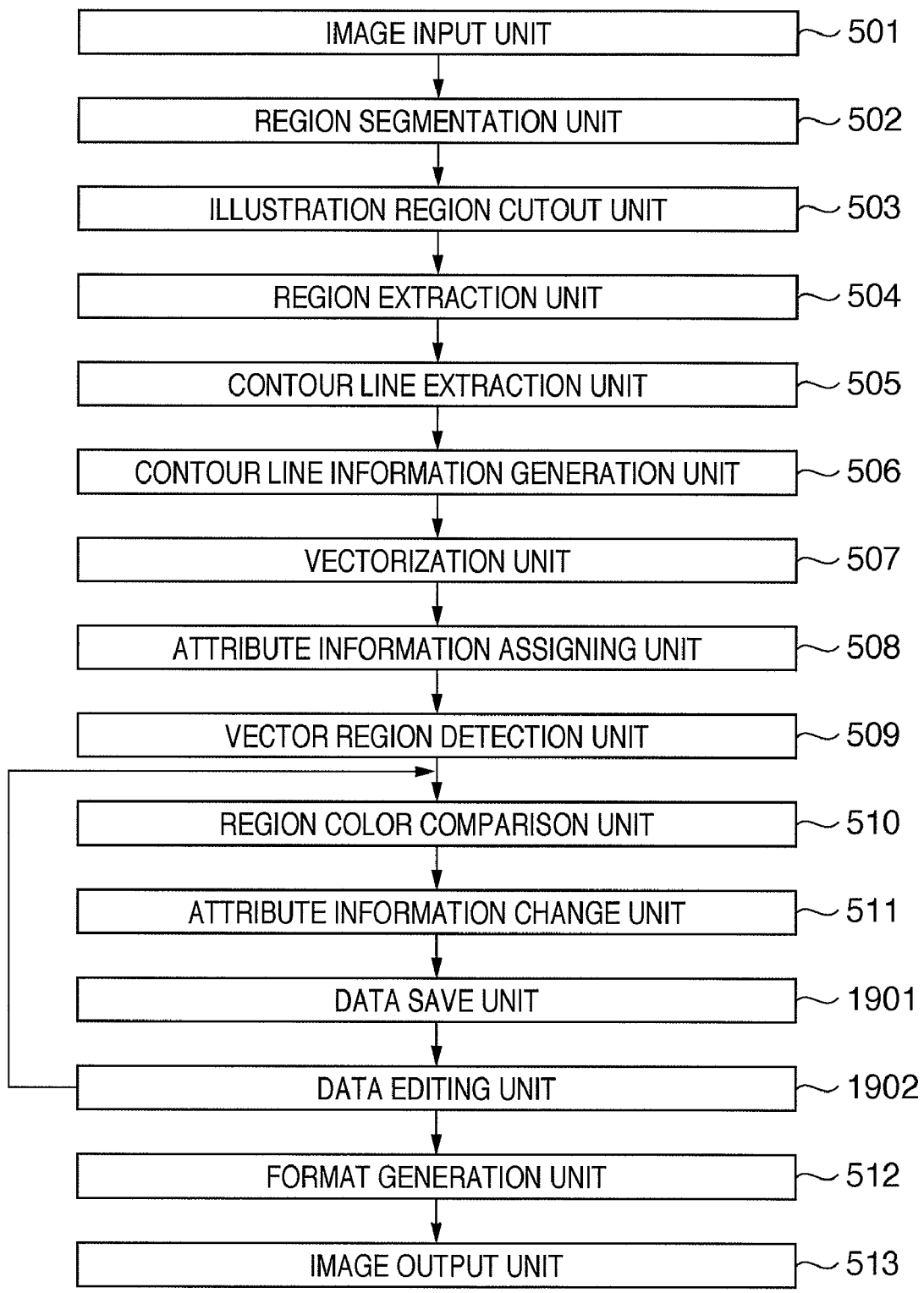
FIG. 19 is a block diagram showing the arrangement of a vector processor in another embodiment.

FIG. 19 is a block diagram showing the arrangement of a vector processor in the other embodiment. The same reference numerals as those in FIG. 5 denote the same parts, and a description thereof will not be repeated.

A data save unit 1901 saves, in an HDD 211, data whose attribute information has been changed by an attribute information change unit 511. A data editing unit 1902 edits data saved by the data save unit 1901.

Assume that the user executes an edit operation via the operation window (not shown) of an operation unit 203 or client PC 101. Examples of the edit operation are enlargement, reduction, copying, movement, and rotation of an illustration region.

During an edit operation of at least one of enlargement, reduction, copying, movement, and rotation, processes by a region color comparison unit 510 to a data save unit 1901 are performed again. After that, the above-described processes by a format generation unit 512 and image output unit 513 are executed.

Figure 20:
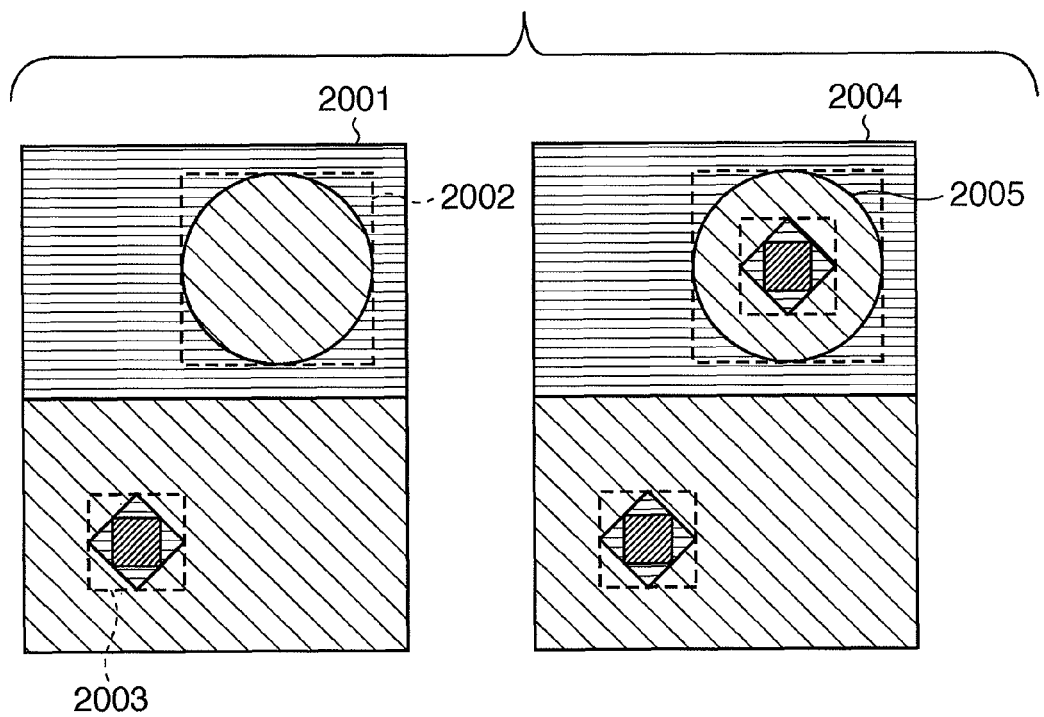
FIG. 20 is a view for explaining an edit operation.

FIG. 20 is a view for explaining an edit operation. Reference numeral 2001 denotes unedited data; reference numeral 2004, edited data; and reference numerals 2002 and 2003, regions obtained as illustration regions by a region segmentation unit 502. As the edit operation, the region 2003 is copied to the center of the region 2002. As described above, the edit operation includes enlargement, reduction, movement, copying, and rotation, and is not limited to the copy operation.

Figure 21:
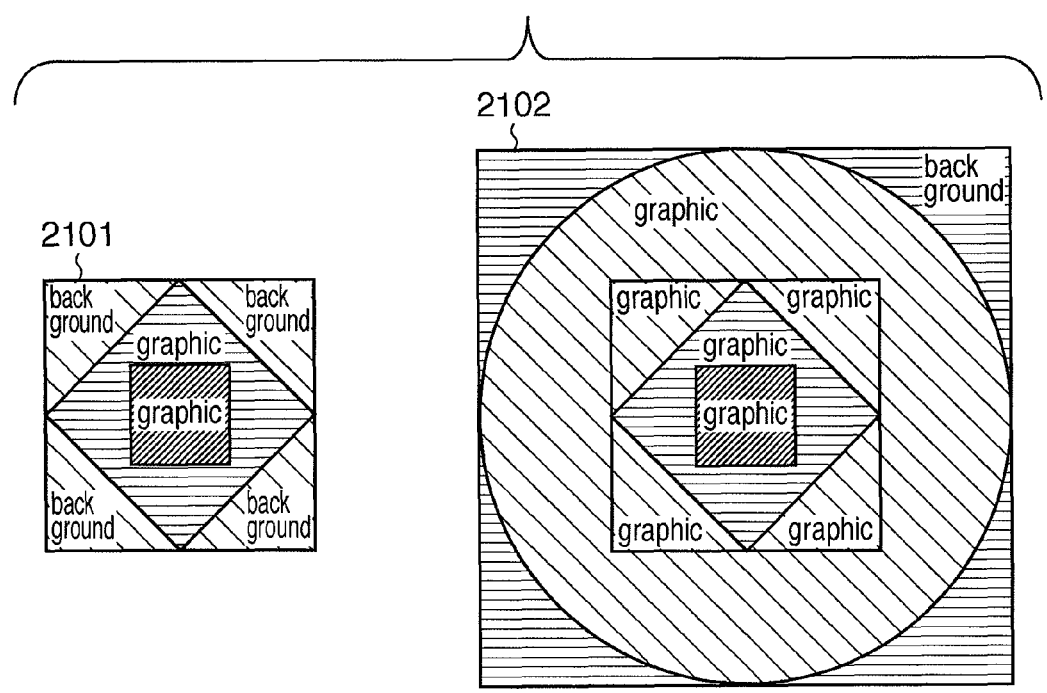
FIG. 21 is a view showing attribute image data of an illustration region 2003 shown in FIG. 20.

FIG. 21 is a view showing attribute image data of the illustration region 2003 shown in FIG. 20. Attribute image data 2101 is an enlarged image of the illustration region 2003. Before editing, attribute information of peripheral vector regions is "background", as described above. Attribute image data 2102 is obtained after performing attribute information change processing after editing. As represented by the attribute image data 2102, the attribute information changes from "background" to "graphic".

Figure 22:
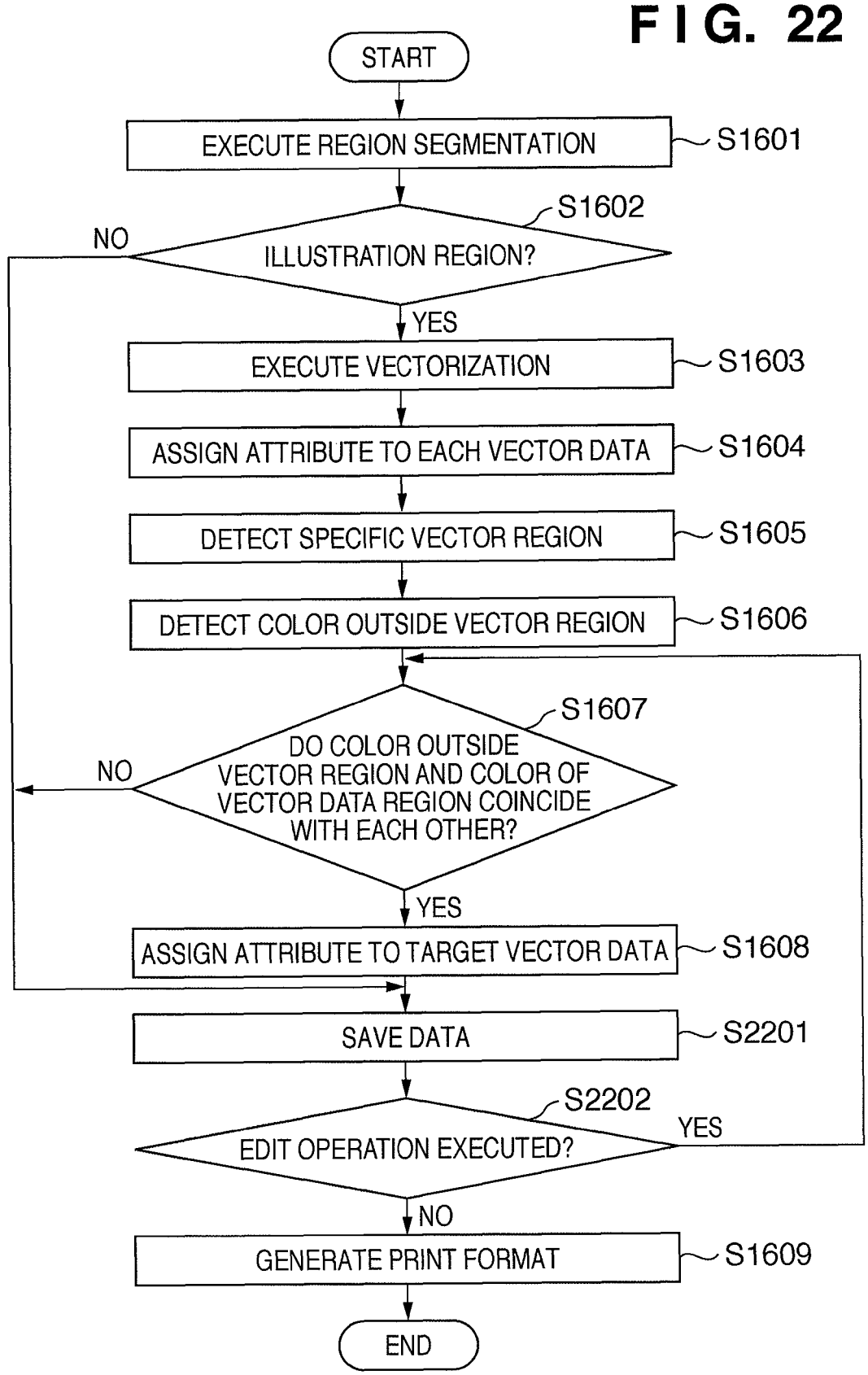
FIG. 22 is a flowchart showing processing in another embodiment.

FIG. 22 is a flowchart showing processing in the other embodiment. The same reference numerals as those in FIG. 16 denote the same processes, and a description thereof will not be repeated.

Processes in steps S1601 to S1608 are the same as those described above. In step S2201, the HDD 211 saves data having undergone attribute information change processing. At this time, the user can execute the following operations 1 to 4:

1. Save data in the HDD 211 and end the process.
2. Edit data, save it in the HDD 211 again, and end the process.
3. Print data without editing it
4. Edit and print data.

As described above, a case wherein the user executes operation 4 to edit and print data will be explained.

In step S2202, it is determined whether data has been edited. If no data has been edited, the process advances to step S1609 to generate a print format. If data has been edited, the process returns to step S1607.

As described above, whether to change attribute information is determined every time an edit operation is done, thereby solving a problem arising from the edit operation. More specifically, the phenomenon in which even pixel regions having the same color data are printed in different tints can be prevented.

Figure 23:
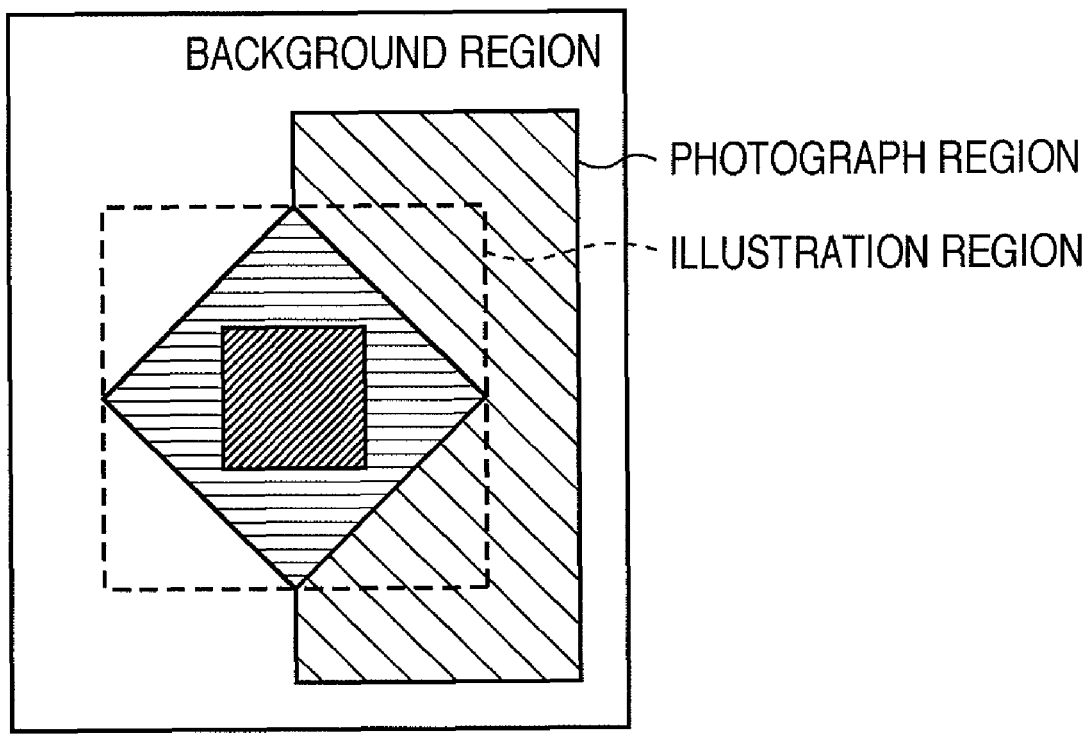
FIG. 23 is a view showing a case wherein a photograph region and background region coexist around an illustration region.

The above-described embodiments have explained a case wherein a background region exists around an illustration region, and a case wherein an illustration region exists around another illustration region. However, the present invention is not limited to these cases. For example, the present invention can also be practiced when a photograph region or a large character exists around an illustration region, or when a text region exists around an illustration region. Regions around an illustration region need not be ones having single attribute information. For example, the present invention can also be practiced when a photograph region and background region coexist around an illustration region, as shown in FIG. 23.

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a recording medium which records software program codes for implementing the functions of the above-described embodiments to a system or apparatus, and reading out and executing the program codes recorded on the recording medium by the computer (or the CPU or MPU) of the system or apparatus.

In this case, the program codes read out from the computer-readable recording medium implement the functions of the above-described embodiments, and the recording medium which records the program codes constitutes the present invention.

The recording medium for supplying the program codes includes a flexible disk, hard disk, optical disk, magnetooptical disk, CD-ROM, CD-R, magnetic tape, nonvolatile memory card, and ROM.

The functions of the above-described embodiments are implemented when the computer executes the readout program codes. Also, the present invention includes a case wherein an OS (Operating System) or the like running on the computer performs some or all of actual processes on the basis of the instructions of the program codes and thereby implements the functions of the above-described embodiments.

Furthermore, the present invention includes a case wherein the program codes read out from the recording medium are written in the memory of a function expansion board inserted into the computer or the memory of a function expansion unit connected to the computer, and the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121648, filed May 7, 2008, which is hereby incorporated by reference herein in its entirety.

What is claimed is:

1. An image processing apparatus comprising:
a segmentation unit configured to segment an input image into a plurality of regions for respective attributes, the plurality of regions including at least an illustration region;
an extraction unit configured to extract color regions based on appearance colors from the illustration region segmented by the segmentation unit;
a vectorization unit configured to generate a plurality of vector data from contour lines of the color regions extracted from the illustration region, and to assign graphic attribute information to the vector data generated from the color regions included in the illustration region;
a detection unit configured to detect, from the plurality of vector data generated from the contour lines of the color regions, vector data corresponding to a circumscribed color region which contacts a region outside the illustration region;
a comparison unit configured to compare a color of the vector data of the circumscribed color region with a color of the region outside the illustration region;
a change unit configured to change, when the color of the vector data of the circumscribed color region and the color of the region outside the illustration region are the same or similar color as a result of the comparison, the graphic attribute information assigned to the vector data of the circumscribed color region of which the color is the same or similar with the color of the region outside the illustration region into attribute information of the region outside the illustration region; and
a generation unit configured to generate data of a predetermined format based on the vector data of the circumscribed color region having the changed attribute information and the vector data of the other color region having the graphic attribute information.

2. The apparatus according to claim 1, wherein the illustration region is a region where a contour of an object is clearer than a natural image, and the number of the appearance colors is limited.

3. The apparatus according to claim 1, wherein the attribute information is an identifier for specifying image processing to be applied to the color region, and is information representing one of a text, an image, graphics, and a line.

4. The apparatus according to claim 1, wherein the generated data of the predetermined format is one of PDF data, SVG data, and PDL data each including the attribute information, vector data, and image data.

5. The apparatus according to claim 1, further comprising a unit configured to generate attribute image data and image data based on the generated data of the predetermined format, and to specify image processing to be applied to the image data based on the attribute image data.

6. The apparatus according to claim 1, further comprising an editing unit that allows a user to perform an edit operation for the illustration region included in the data generated by the generation unit,
wherein when the edit operation is performed, said comparison unit and said change unit are further executed for the edited illustration region.

7. The apparatus according to claim 6, wherein the edit operation includes at least one of enlargement, reduction, copying, movement, and rotation.

8. An image processing method comprising:
segmenting an input image into a plurality of regions for respective attributes, the plurality of regions including at least an illustration region;
extracting color regions based on appearance colors from the segmented illustration region;
generating a plurality of vector data from contour lines of the color regions extracted from the illustration region, and assigning graphic attribute information to the vector data generated from the color regions included in the illustration region;
detecting, from the plurality of vector data generated from the contour lines of the color regions, vector data corresponding to a circumscribed color region which contacts a region outside the illustration region;
comparing a color of the vector data of the circumscribed color region with a color of the region outside the illustration region;
changing, when the color of the vector data of the circumscribed color region and the color of the region outside the illustration region are the same or similar color as a result of the comparison, the graphic attribute information assigned to the vector data of the circumscribed color region of which the color is the same or similar with the color of the region outside the illustration region into attribute information of the region outside the illustration region; and
generating data of a predetermined format based on the vector data of the circumscribed color region having the changed attribute information and the vector data of the other color region having the graphic attribute information.

9. A non-transitory computer-readable recording medium recording a program for causing a computer to execute an image processing method defined in claim 8.

* * * * *